United States Patent [19]

Schotz et al.

[11] Patent Number: 5,946,343
[45] Date of Patent: Aug. 31, 1999

[54] DIGITAL WIRELESS SPEAKER SYSTEM

[75] Inventors: Larry Schotz, Mequon; William R. Steinike, Gratfton; Mark R. Wolski, Glendale, all of Wis.

[73] Assignee: L. S. Research, Inc., Cedarburg, Wis.

[21] Appl. No.: 09/066,721

[22] Filed: Apr. 24, 1998

Related U.S. Application Data

[63] Continuation of application No. 08/826,360, Mar. 26, 1997, which is a continuation-in-part of application No. 08/344,298, Nov. 22, 1994, abandoned.

[51] Int. Cl.⁶ .................................................. H04B 15/00
[52] U.S. Cl. .......................... 375/200; 375/202; 375/206; 375/209
[58] Field of Search .................................... 375/200, 202, 375/206, 260, 209; 380/34; 348/525; 340/825.25; 381/14

[56] References Cited

U.S. PATENT DOCUMENTS

| | | |
|---|---|---|
| 4,193,030 | 3/1980 | Rabow et al. ............................ 380/34 |
| 4,621,374 | 11/1986 | Micic et al. . |
| 4,802,171 | 1/1989 | Rasky . |
| 4,829,570 | 5/1989 | Schotz . |
| 4,941,150 | 7/1990 | Iwasaki . |
| 5,157,686 | 10/1992 | Omura et al. . |
| 5,166,953 | 11/1992 | Hershey et al. . |
| 5,182,552 | 1/1993 | Paynting ............................ 340/825.25 |
| 5,299,264 | 3/1994 | Schotz et al. ............................ 381/14 |
| 5,375,174 | 12/1994 | Denenberg . |
| 5,392,300 | 2/1995 | Borth et al. . |
| 5,398,002 | 3/1995 | Bang . |
| 5,406,634 | 4/1995 | Anderson et al. . |
| 5,420,640 | 5/1995 | Munich ................................. 348/525 |
| 5,491,839 | 2/1996 | Schotz . |
| 5,581,617 | 12/1996 | Schotz et al. . |
| 5,619,524 | 4/1997 | Ling et al. ............................... 375/200 |

FOREIGN PATENT DOCUMENTS

| | | |
|---|---|---|
| WO 94/28639 | 12/1994 | European Pat. Off. . |
| WO 95/34960 | 12/1995 | European Pat. Off. . |
| 44 18337 A1 | 11/1995 | Germany . |
| 2276 794 | 5/1995 | United Kingdom . |

OTHER PUBLICATIONS

Gravina E–Z Comm Wave—Voltage Controlled Oscillators from 20 MHz to 310.
Space Technology Hyper–Fec III CMOS Hard Decision Forward Error Correction Encoder/Decoder—241203.
AT & T Jul. 1991 TRU050 Clock Recovery and Data Retiming Module.
Phillips Aug. 1993 Stereo Filter and Codec for MPEP layer audio applications—SAAA2520.
Motorola DSP56000—24–Bit Digital Signal Processors.
Crystal Semiconductor Corporation Nov. 1993 Digital Audio Interface Receiver—CSS8411, CSS8412.
ATMEL AT48802—Spread Spectrum Signal Processor Integrated Circuit.

(List continued on next page.)

*Primary Examiner*—Stephen Chin
*Assistant Examiner*—Shuwang Liu
*Attorney, Agent, or Firm*—Caesar, Rivise, Bernstein, Cohen & Pokotilow, Ltd.

[57] ABSTRACT

This invention discloses a digital wireless speaker system for use in consumer audio applications. A digital radio frequency transmitter is connected to an analog or digital audio source and a digital radio frequency receiver provides for reception of the transmitted audio information in remote locations. In addition, the digital receiver will be able to receive control information to implement such things as volume, tone controls, or other auxiliary information. This allows the user to listen to high quality audio in a variety of locations without the need of independent stereos or external wires. The system is based on digital circuitry to improve the performance of the system and provide for compact disc quality sound. The digital circuitry incorporates forward error correction techniques and interleaving to enable the system to account for errors in transmission and thus improve the overall performance of the system.

1 Claim, 17 Drawing Sheets

OTHER PUBLICATIONS

Hewlett–Packard Silicon Bipolar MMIC 5 GHz Active Double Balanced Mixer/IF Amp–Technical Data—IAM–82008.

Hewlett–Packard 1.5—8 GHz Low Noise GaAs MMIC Amplifier—Technical Data—MGA–86576.

Penstock/Sawtek IF/RF Microwave Distribution Penstock/Sawtek Info/Card 59–70 MHz SAW Filters.

Microchip Technology, Inc. 1994 ROM–Based 8–Bit CMOS Micro–Controller—PIC16CR57A.

Teledyne Electronic Technologies TAE–1020 2.4GHz GaAs MMIC ISM Band Power Amplifier.

Phillips 1993 Masking threshold processor for MPEG layer 1 audio compression applications SAA2521.

RF Micro–Devices Low Noise Amplifier/Mixer RF2401.

RF Micro–Devices 2.5 GHz Direct Quadrature Modulator RF2422.

GEC Plessey Semi–Conductors 50M–Bit Manchester BiPhase–Mark Encoder and Led Driver—SP9960 & 50M–Bit Manchester BiPhase Decoder—SP9921.

Piezoelectric Devices M2 Series (D300) Voltage Controlled Oscillators for Digital Audio.

Fujitsu Apr. 1991 Edition 2.0 MB1508 Serial Input PLL Frequency Synthesizer.

Phillips Jul. 1993 Bitstream conversion ADC for Digital audio systems—SAA7360.

Motorola 1993 Serial Input PLL Frequency Synthesizer—MC12210.

Space Research Technology SRT–24INT Interleaver/Deinterleaver Controller Chip (Preliminary data sheet).

Z–Communications 1994 SMV2500—Voltage Controlled Oscillator.

Phillips May 1993 Stereo 1 FS data input upsampling Filter with bitstream continuous calibration DAC—TDAA1305T.

RF Micro–Devices 2.5 GHz Medium Power Linear Amplifier—RF2127.

RF Micro–Devices Preliminary Quadrature Modulator/Demodulator—RF2703.

Spread Spectrum for Commercial Communications Apr. 1991 IEEE Communications Magazine.

PCT/US/96/01648 Mar. 27, 1997 PCT International Search Report.

PCT/US96/04131 Mar. 26, 1996 International Search Report.

06077100 Oct. 31, 1995 Patent Abstracts of Japan.

Principles of Digital Audio, XP002017123 Chapter 8 "Error Correction" 1989 Ken Pohlman pp. 210–228.

Federal Communications Commission 47 CFR Oct. 1995 §§15.247 and 15.249.

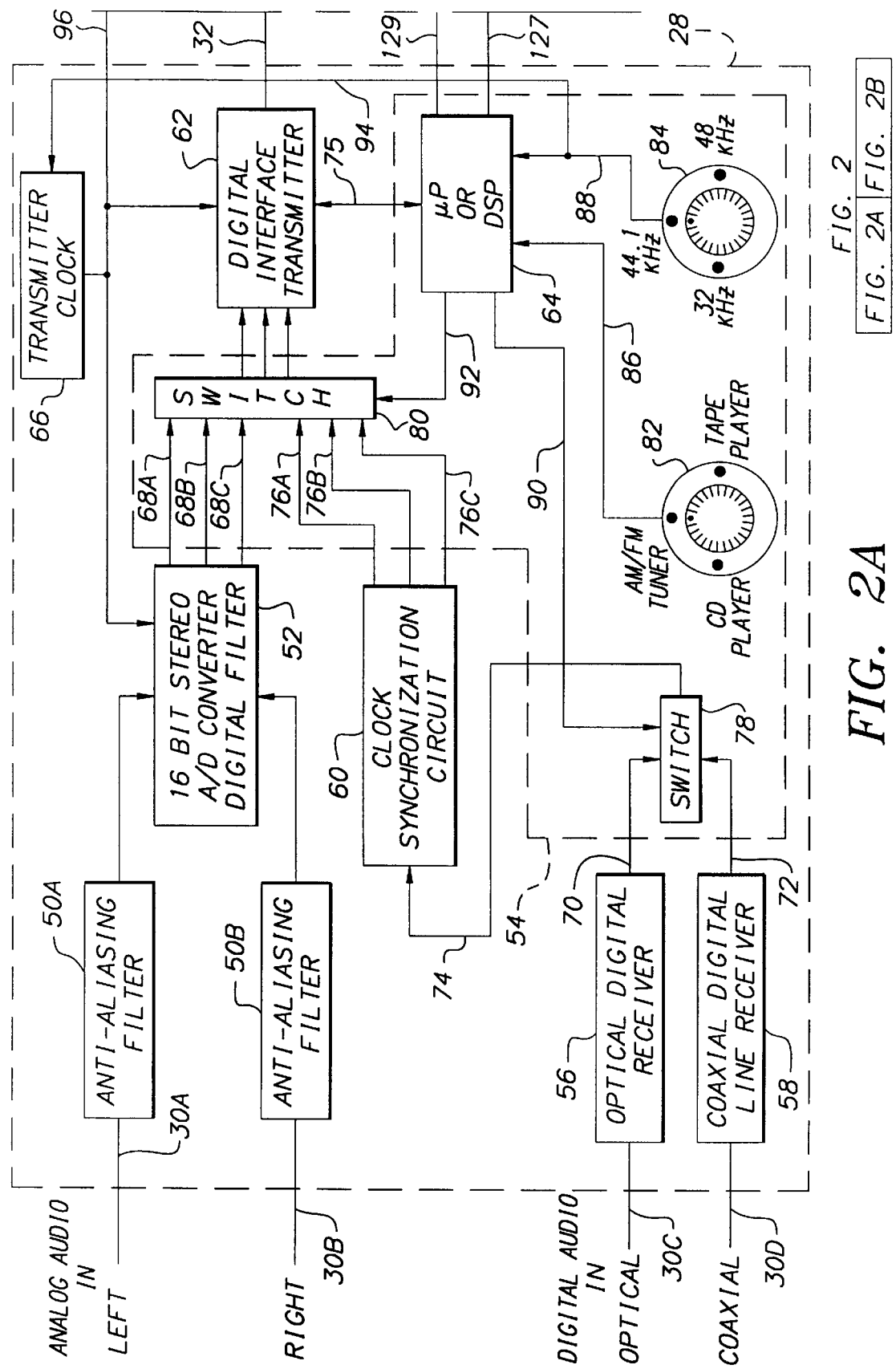

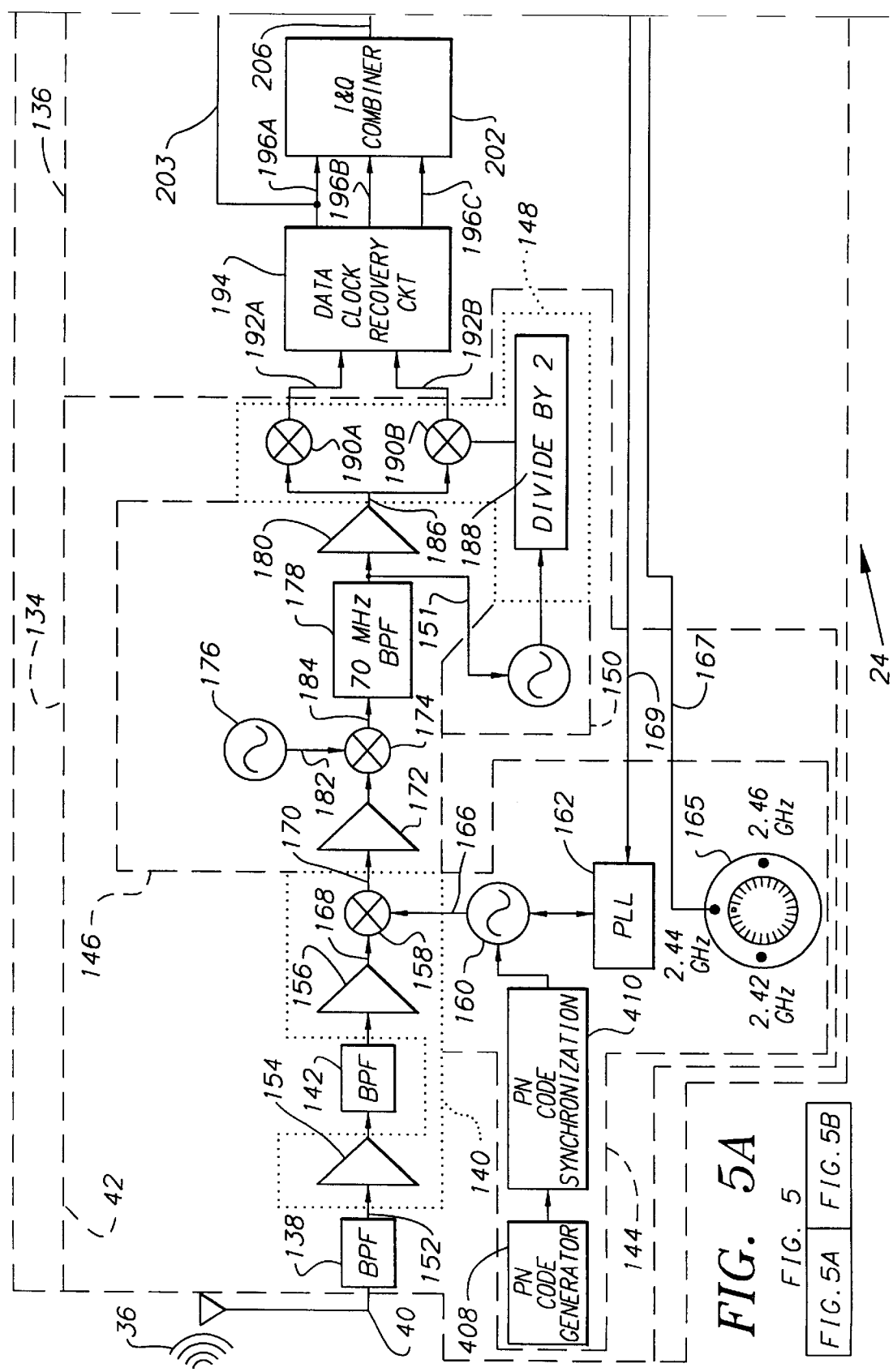

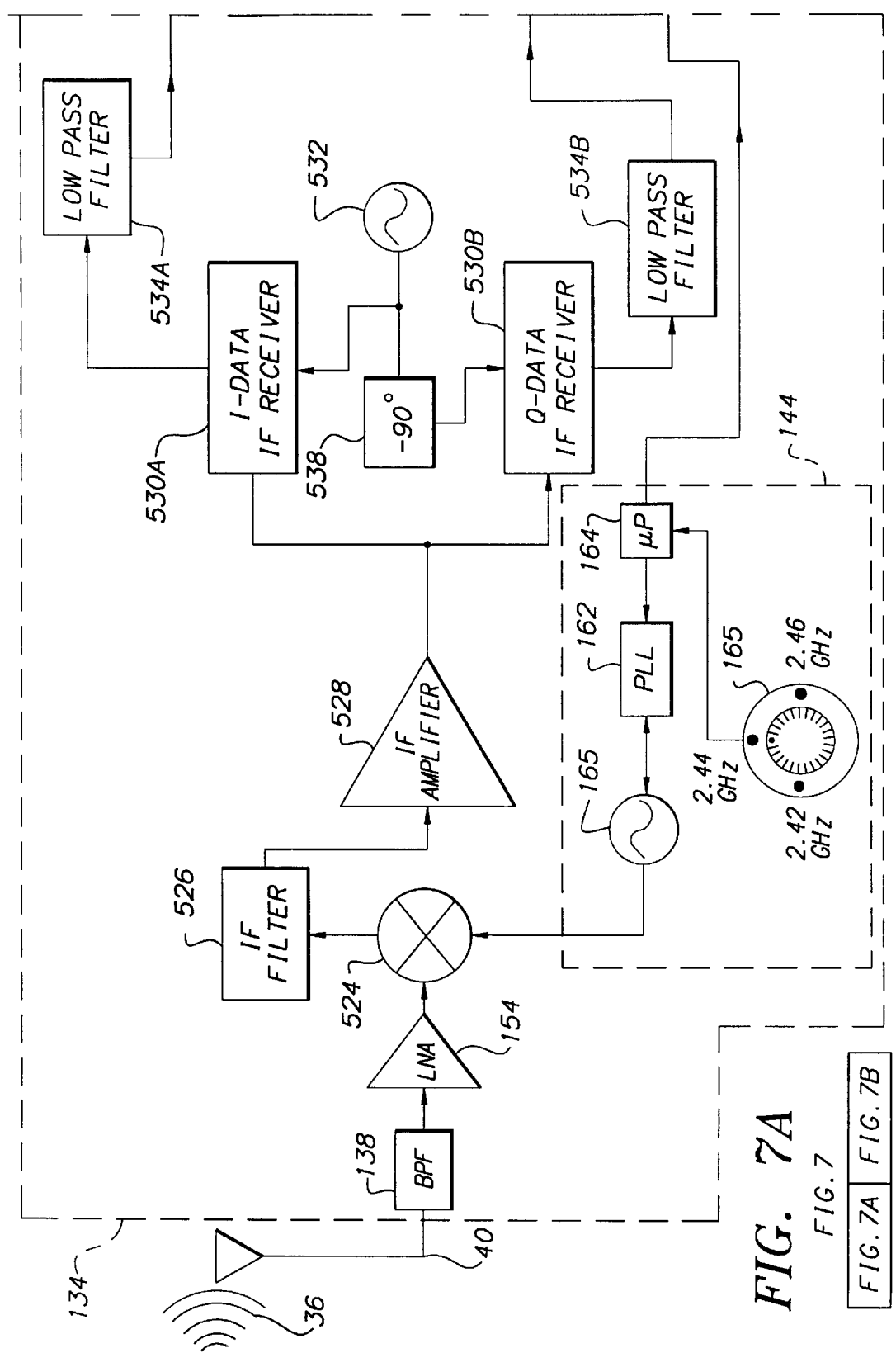

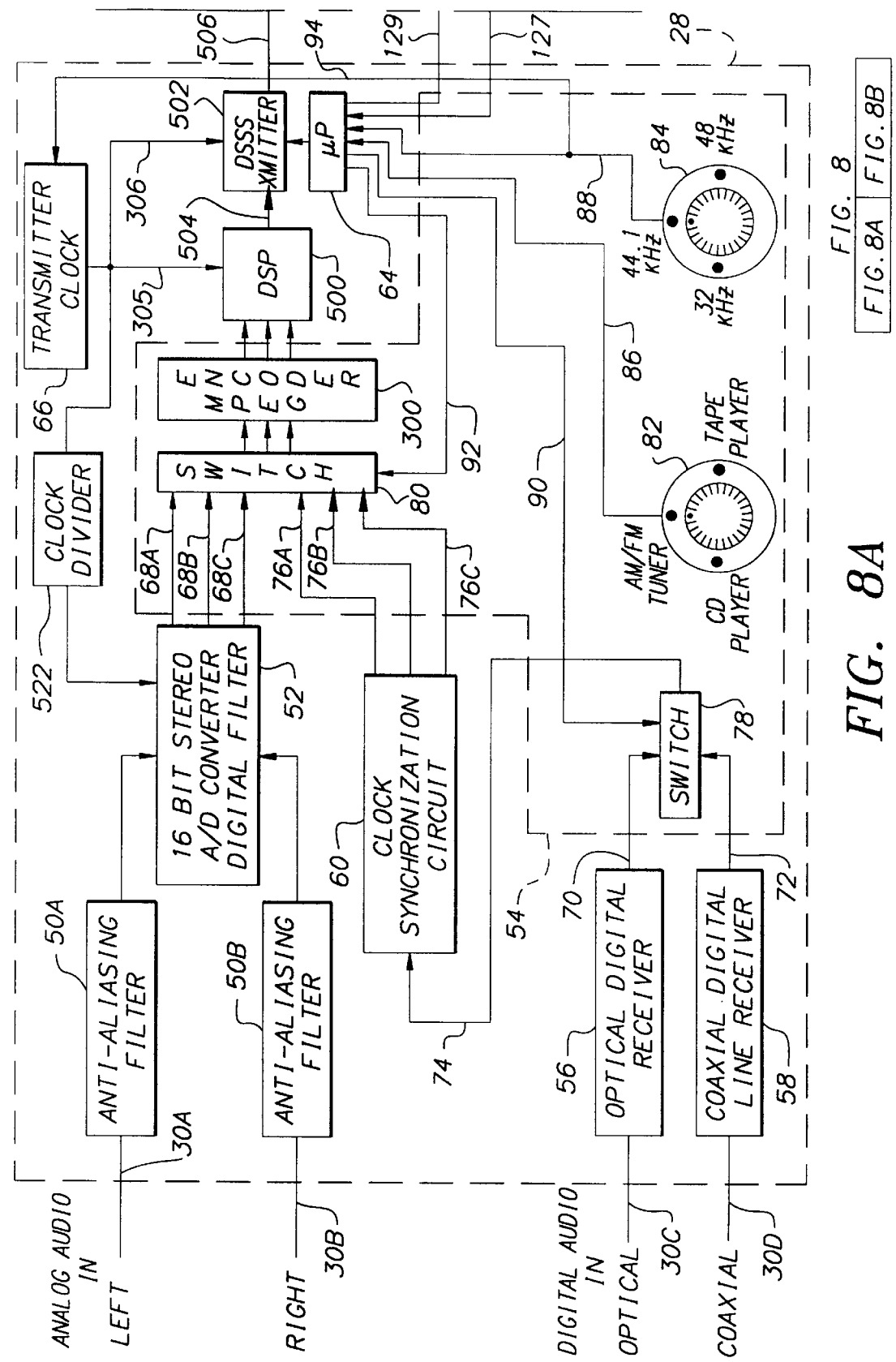

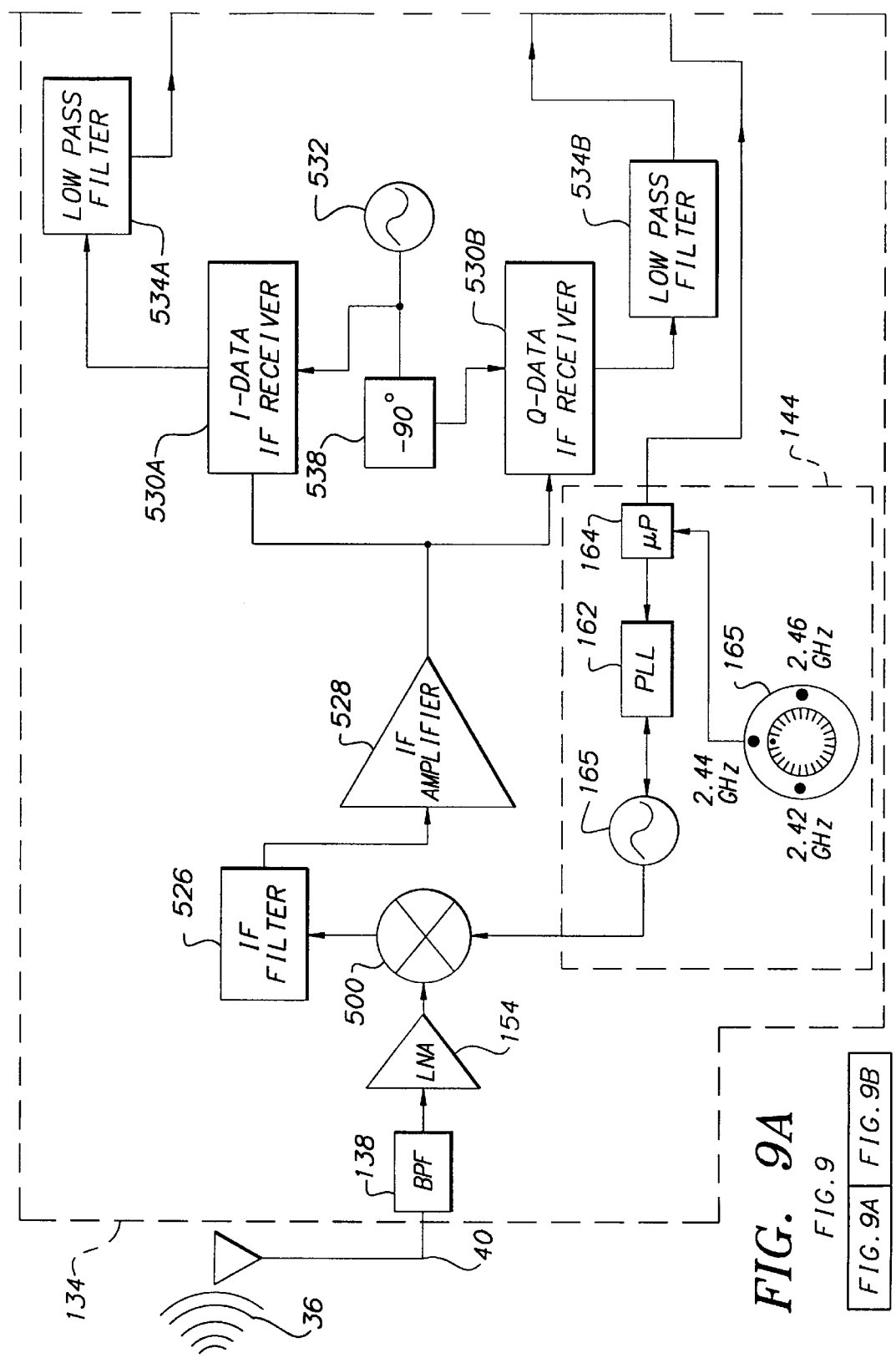

DIGITAL WIRELESS SPEAKER SYSTEM

RELATED APPLICATIONS

This application is a Continuation of application Ser. No. 08/826,360 filed on Mar. 26, 1997, which is in turn a Continuation-in-Part of application Ser. No. 08/344,298 filed on Nov. 22, 1994 (now abandoned) all of which are entitled DIGITAL WIRELESS SPEAKER SYSTEM and all of which are assigned to the same Assignee, namely L.S. Research, Inc. and all of whose disclosures are incorporated by reference herein.

The invention relates generally to the transmission and reception of information such as analog or digital audio data over the air. More particularly, the invention pertains to the transmission/reception of high fidelity, stereo digital audio signals over the air over short distances using a high frequency carrier at low power.

BACKGROUND OF INVENTION

A number of systems have been developed to avoid wiring stereo speakers directly to the source of signals used to drive the speakers, e.g., phonographs, tape decks, CD players, or AM/FM tuners. By way of example, U.S. Pat. No. 4,829,570, issued to Larry Schotz on May 9, 1991, discloses a system of this type. This system, while not requiring direct wiring between the source of signals and the speaker, transmits the signals over the A.C. electrical conductors of the building in which the system is located. The signals transmitted in this manner are subject to certain undesirable effects, such as filtering for computer systems. This type of filtering may eliminate or degrade the signals intended for transmission to the speakers.

An alternative to using any form of wiring between a speaker and the source of signals for driving the speaker is to transmit the signals over the air via electromagnetic waves such as radio waves. This type of system requires the use of a transmitter for transmitting the signals, a receiver for receiving the signals at the speaker, and a power amplifier for amplifying the signals at the speakers to properly drive the speakers. The drawback with this type of system is that the FCC strictly regulates the frequencies at which information may be transmitted over the air without the requirement of an appropriate license. Additionally, the number of frequencies at which transmission may occur is limited. Currently, the frequency bands available for transmitting information using low power transmission without a license are at high frequency ranges. For example, the FCC currently allows the use of low power transmission (i.e., below 1 milliwatt for conventional modulation or below 1 watt for spread spectrum modulation, 47 CFR §15.249) in the range of 902 to 928 MHz, 2.4 to 2.483 GHz and 5.725 to 5.875 GHz. Such wireless speaker systems are disclosed in U.S. Pat. Nos. 5,299,264 (Schotz et al.) issued on Mar. 29, 1994 and 5,581,617 (Schotz et al.) issued on Dec. 6, 1996, both of which are also assigned to the same assignee as the present invention. Another related type of wireless speaker system is disclosed in U.S. Pat. No. 5,491,839 (Schotz) issued on Feb. 13, 1996, which is also assigned to the same assignee as the present invention, and which discloses a system for simultaneously transmitting a plurality of audio source signals to wireless speakers.

Wireless speaker systems are desirable, since wiring is not required between the speakers and source of signals for driving the speakers; however, an arrangement of this type is not practical if the quality of the information signal driving the speaker is poor. Stereo speaker applications require high signal-to-noise ratios, good frequency response, low distortion, and stereo capability (simultaneous transmission of two channels of information) to be practical. A wireless speaker system is not a replacement for a system using wires unless the quality of information signals provided to drive the speakers results in a sound at the speakers comparable with the sound at similar speakers in a system using wires.

Moreover, a wired speaker system does not teach nor even suggest the implementation of a wired speaker system for the following reasons. A wired speaker system can have a wire or bus dedicated to a particular signal(s) that is directly transmitted from the audio source to the speaker(s). The audio source and speakers are thus always electrically coupled together. Because the signal(s) are confined to the wire/bus, signal errors due to noise can be overcome by increasing the power carried through the wire/bus; in some cases, the speaker can even communicate back to the audio source over this wire/bus. In contradistinction, a wireless speaker system is susceptible to RF dropouts or loss of data due to RF interference, low signal strength, multipath, etc., (e.g., someone standing in front of the transmitter antenna or even touching it); the result is that the receiver can do nothing but await another transmission from the transmitter. Furthermore, because there is no wire/bus between the transmitter and the receiver, there must also be a method of almost instantaneous resynchronization in place between the transmitter and the receiver in order to prevent gaps or "dead time" in the audio signal. In addition, the wireless speaker system is not permitted to increase power to overcome signal errors due to noise as is permitted in wired speaker systems as discussed above; to meet FCC guidelines the power permitted for transmitting such high fidelity stereo audio signals over the air must not exceed a certain power level (e.g., 1 mW for the 900 MHz range, and the 2.4 GHz range where spread spectrum modulation is not used). Thus, for example, the wired analog speaker system disclosed in U.S. Pat. No. 5,182,552 (Paynting) merely suggests the use of wireless speakers but fails to recognize any of the above problems, let alone solve these problems.

In addition, many compact disc players and digital audio tape players provide digital audio data output outlets, as well as analog audio data output outlets. In many instances, the speakers are hard-wired to the analog audio output outlets, rather than to the digital audio output outlets. The problem with this is that the compact disc players and digital audio tape players process the audio signal digitally and then must convert the audio signal back to an analog signal for transmission over the speaker wire for ultimate use by the speaker. Such digital to analog conversion introduces additional signal distortion at the player before transmission on the line. It would be desirable to directly use the digital version of the audio signal (available at the digital audio data output outlets), thereby keeping distortion to a minimum, and then making the digital to analog conversion as close to the speaker as possible, after transmission is completed.

The transmission/reception of audio signals, e.g., music, (approximately 20 Hz to 20 kHz) must be distinguished from the transmission/reception of voice signals (approximately 300 Hz to 3 kHz). The former requires wideband transmission while the latter requires only narrowband transmission. Furthermore, where the transmission/reception of audio signals is accomplished using digital techniques, the transmission bandwidth must be further widened based on audio source sampling frequency, the standard use of two channels for audio, the number of bits per channel and any encoding process. These factors can easily require a significant transmission bandwidth.

As stated earlier, a wireless speaker system is no replacement for a wired speaker system if the quality of the information signals required to drive the speakers is poor. Thus a wired digital speaker system, such as the one disclosed in U.S. Pat. No. 5,406,634 (Anderson et al.), does not encounter any of the problems of a wireless speaker system (as discussed above) nor does it encounter the following problems of a digital wireless speaker system. In particular, the transmitter in a digital wireless speaker system must create a continuous digital data stream from the audio inputs (e.g., a left and right stereo channel) and then transmit that serial digital data stream over the air to a remote receiver. The receiver must be able to take the single digital data stream and recreate the multiple signals while minimizing bit errors. Furthermore, the recreation of high fidelity sound from a single digital data stream requires a high data rate transfer (e.g., 1.4 Mbps digital audio bit rate) from the transmitter to the receiver and the receiver must be precisely synchronized to provide such high fidelity recreation.

Synchronization between the transmitter and the receiver in a digital wireless speaker system is severely complicated because of (1) the need to perform initial data synchronization, (2) the ability to continuously resynchronize and (3) the need to perform data clock recovery. Implementing a digital wireless speaker system requires a continuous method of data synchronization because the system is continuous, real time system which operates at such a high digital audio bit rate (1.4 Mbps); if RF dropout should occur, the system cannot simply re-send the data but rather the system must be able to automatically resynchronize and it must do so at the high digital audio bit rate. If the receiver of the system is unable to automatically synchronize, the resultant stereo audio input is interrupted, thereby degrading the system performance.

The synchronization is comprised of two components, the initial synchronization and resynchronization. Once the wireless speaker system obtains initial synchronization from an embedded synchronization code in the received data, the receiver then must monitor the data to insure it stays synchronized. If the system loses synchronization from an RF artifact, it then must have a method to resynchronize quickly. Furthermore, a wireless digital audio system is complicated by the fact that not only must data synchronization be performed, but data timing or bit timing must also be synchronized with the transmitter. A wired digital speaker system does not have to concern itself with bit timing because the transmitter and receiver clock signals can be obtained from the same source. In contradistinction, even the smallest error in clock rates between the wireless digital audio transmitter and the wireless digital audio receiver will result in bit errors in the receiver and synchronization could be lost. Thus, there is a need for a high speed clock recovery circuit that locks onto the transmitter's clock.

Many digital data systems send packets of information from which the receiver synchronizes. However, in a wireless system, it is unknown when at which point data will be lost and upon return of the data there must be a synchronization without waiting for a packet or other header information. Failure to synchronize as such causes the audio to appear interrupted, i.e., non-continuous, and it would degrade the system performance. To send such packets in a digital wireless speaker system to be able to resynchronize in a small period of time would require very small packets but would require impractical data rates due to the added overhead.

It should also be understood that communication systems, e.g., personal communication systems (PCS) such as that disclosed in U.S. Pat. No. 5,392,300 (Borth et al.) do not teach nor suggest the implementation of a digital wireless speaker system. Although a PCS comprises a transmitter and receiver that may operate in the 900 MHz or even the 2.4 GHz range, operation of a PCS transmitter/receiver is totally different from the operation of a wireless speaker system. In particular, the audio content of a PCS, i.e., voice, is different from the audio content of a wireless speaker system, i.e., high fidelity stereo sound; as stated earlier, the former requires only narrowband transmission whereas the latter requires wideband transmission. Second, the data rate of a PCS that utilizes digitized speech/voice information (e.g., approximately 64 kbps) is nowhere near the approximate 1.4 Mbps digital audio bit rate necessary for high fidelity sound.

Accordingly, the need exists for a wireless speaker system capable of transmitting and receiving high fidelity, stereo digital audio over the air at a high digital audio bit rate while continuously maintaining synchronization between the transmitter and receiver using a high frequency carrier at low power and maintaining the quality of the audio that is comparable to wired speaker systems.

OBJECTS OF THE INVENTION

Accordingly, it is the general object of this invention to provide an apparatus which overcomes the disadvantages of the prior art.

It is still a further object of this invention to enable the user to listen to high quality audio in any remote location without external wires or independent equipment.

It is even yet a further object of this system to provide the user with compact disc quality sound through a wireless system.

It is yet a further object of this invention to provide, through the use of digital processing, a wireless speaker system that achieves performance similar to that found in top quality audio products.

It is still yet another object of this invention to provide a system that can directly transmit the digital audio data output available from compact disc players, digital audio tape players and any other digital audio sources.

It is yet another object of this invention to provide a system that can directly transmit the analog audio output available from compact disc players, digital audio tape players, as well as other sources.

It is yet another object of the present invention to provide a system that can continuously synchronize the transmitter and receiver at a high digital audio bit rate.

It is still yet another object of the present invention to provide a high fidelity stereo wireless speaker system that can operate in the 2.4 GHz frequency band.

It is still even yet another object of the present invention to provide a high fidelity stereo system that utilizes frequency hopping in compliance with 47 C.F.R. §15.247–15.249.

It is even another object of the present invention to provide a high fidelity stereo system that utilizes direct sequence in compliance with 47 C.F.R. §15.247–15.249.

It is yet a further object of this invention to provide a system for determining when the received audio data is invalid and muting that audio data until the validity of the audio data is restored.

It is yet a further object of this invention to provide a system for interpolating or muting the analog audio output whenever the received audio data is invalid.

SUMMARY OF THE INVENTION

These and other objects of the instant invention are achieved by providing a high fidelity, wireless transmission, stereo audio system for use with at least one audio source (e.g., an AM/FM tuner, a CD player, a digital audio tape player) which provides an audio input signal. The audio system is arranged for wirelessly transmitting over the air an electrical signal, susceptible to RF dropout, representing the audio input signal. The stereo audio system comprises a transmitter that is arranged to be coupled to at least one audio source. The transmitter comprises input means for converting the audio input signal into a first digital serial bit stream signal at a high digital audio bit rate and whereby the first digital serial bit stream signal comprises a first embedded synchronization signal for distinguishing left and right audio data in the audio input signal. The transmitter further comprises forward error correction encoding means for encoding the first digital serial bit stream signal to produce an encoded digital serial bit stream signal at the high digital audio bit rate and wherein the encoded digital serial bit stream signal comprises a second embedded synchronization signal detectable by a receiver decoder for initiating decoding. The transmitter further comprises convolutional interleaving means for interleaving the encoded digital serial bit stream signal and for introducing a third embedded synchronization signal therein to form a second digital serial bit stream signal at the high digital audio bit rate and whereby the third embedded synchronization signal is detectable by a receiver deinterleaver for initiating deinterleaving. The transmitter further comprises carrier signal producing means for producing a carrier signal of a predetermined frequency of at least 2.4 GHz, a modulation means for modulating the carrier signal with the second digital serial bit stream signal to produce a modulated carrier signal and a first antenna means for emitting over the air the modulated carrier signal at a power level not exceeding approximately 1 milliwatt. Finally, the audio system comprises a receiver located within a range of approximately 10 to 300 feet (3 to 90 meters) of the transmitter and being coupled to an audio transducing device (e.g., a speaker). The receiver demodulates the modulated carrier signal into a audio output signal.

DESCRIPTION OF THE DRAWINGS

Other objects and many of the attendant advantages of this invention will be readily appreciated as the same becomes better understood by reference to the following detailed description when considered in connection with the accompanying drawings wherein:

FIGS. 2A and 2B together illustrate a block diagram of the transmitter of the digital wireless speaker system;

FIGS. 5A and 5B together illustrate a block diagram of the receiver of the digital wireless speaker system using frequency hopping spread spectrum demodulation;

FIGS. 7A and 7B together illustrate a block diagram of the receiver of the digital wireless speaker system using direct sequence spread spectrum demodulation;

FIGS. 8A and 8B together illustrate a block diagram of the transmitter of FIGS. 6A–6B that uses audio compression; and FIGS. 9A and 9B together illustrate a block diagram of the receiver of FIGS. 7A–7B that uses audio decompression.

DETAILED DESCRIPTION OF THE PREFERRED EMBODIMENT

Figure 1:
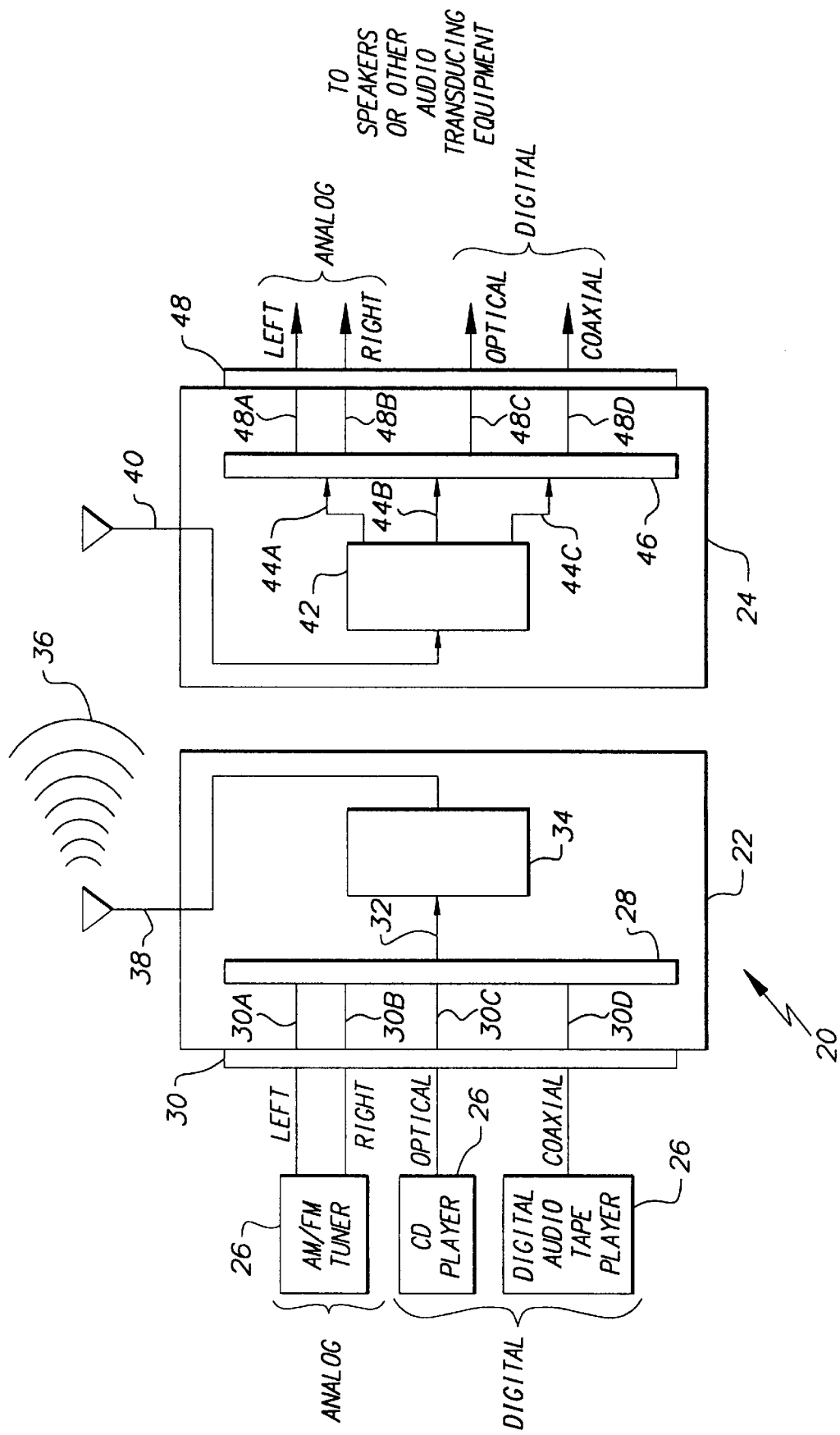
FIG. 1 is a diagram of the digital wireless transmission system.

Referring now in detail to the various figures of the drawing wherein like reference characters refer to like parts, there is shown at 20 in FIG. 1, the digital wireless speaker system.

The system 20 comprises a transmitter 22 and a receiver 24, each utilizing respective digital audio circuitry. Audio source equipment 26 (e.g., AM/FM tuner, phonograph, compact disc player, digital audio tape player, etc.) are coupled to the transmitter 22 via coupling means 30. The audio source equipment 26 provide audio input signals, in either analog or digital format, via coupling means 30 to input means 28. In particular, analog left and right audio channel signals are accommodated on input lines 30A and 30B, respectively, while a digital optical audio signal is accommodated on an optical input line 30C; a digital audio signal is accommodated on a coaxial input line 30D. Among other things, the input means 28 also allows the user to select which audio source equipment 26 input signal on input lines 30A–30D is to be transmitted to the remotely located receiver 24, as will be discussed in detail later. The input means 28 also converts any analog audio input signals into digital format.

It should be noted that although FIG. 1 shows a CD player having an optical output and a digital audio tape player having a coaxial output as being coupled to the transmitter 22, each audio source has both optical and coaxial outputs; for simplicity, only one of the two types of outputs was depicted for each audio source.

Once a particular audio input signal has been selected, and converted to a digital format (if not in a digital format already), the transmitter digital audio circuitry 34 processes that selected signal which is available on digital input line 32. The digital audio circuitry 34 basically modulates a 2.4 GHz carrier frequency signal with the selected audio input signal and prepares a broadcast signal 36 for transmission to the receiver 24. The broadcast signal 36 is transmitted from the transmitter antenna 38 and over the air to the receiver 24.

The receiver 24, located at a remote site (e.g., another room, floor level, etc., in the range of approximately 10 to 300 feet from the transmitter 22), receives the broadcast signal 36 via a receiver antenna 40. The receiver's digital audio circuitry 42 then demodulates the audio information from the broadcast signal 36 into respective digital output signals on lines 44A, 44B and 44C that are provided to an output means 46. The output means 46 provides the particular signal format, digital or analog, via audio output lines 48A, 48B, 48C or 48D to a coupling means 48 for connection to speakers or other audio transducing equipment.

The details of the transmitter 22 will now be discussed. As shown in FIG. 2A, the input means 28 comprises anti-aliasing filters 50A and 50B, a 16-bit stereo A/D converter digital filter 52, a switching means 54, an optical digital receiver 56, a coaxial digital line receiver 58, a clock synchronization circuit 60, a digital interface transmitter 62, a transmitter microprocessor (μP) 64 (or a digital signal processor, DSP) and a transmitter clock 66. At this juncture it should be noted that although the transmitter microprocessor 64 (e.g., EPROM-based 8-bit CMOS Microprocessor PIC16C55 or a digital signal processor, e.g., Motorola DSP56002) is shown in FIG. 2A as comprising a part of the switching means 54, the microprocessor 64 also forms a part of the phase-locked loop in the digital circuitry 34, to be discussed later. Although a separate, dedicated microprocessor could be used exclusively in the digital circuitry 34, the microprocessor 64 is capable of multi-purpose use within both the input means 28 and the digital audio circuitry 34.

The anti-aliasing filters 50A and 50B process the left and right analog audio channel input signals, respectively, on input lines 30A and 30B, respectively. The purpose of these filters is to reduce errors in the analog-to-digital conversion, which follows the aliasing filters. The filtered left and right analog audio input signals are then fed to the A/D converter 52 (e.g., Philips Semiconductor SAA7360 A/D converter) where they are converted to the digital $I^2S$ format or some other digital format. The A/D converter 52 also incorporates a digital filter to further suppress any aliasing errors. The output from the A/D converter is typically referred to as a digital audio interface comprising three main signals: a word clock on line 68A, a word data on line 68B, and a word select on line 68C. These three signals are then fed to a first switching element of switching means 54, which will be discussed later.

The digital wireless speaker system 20 also accommodates direct digital input on audio input lines 30C and 30D. Digital audio outputs are commonly found on compact disc players and digital audio tape players as well as other sources. By using this direct digital input feature, the digital audio information is not further degraded by having multiple analog-to-digital and digital-to-analog conversions, as often occurs in most conventional audio processing equipment where such digital inputs are used. In particular, the digital inputs to the system 20 can be either optical (line 30C) or coaxial (line 30D). A coaxial input means a digital audio signal that is available to the transmitter 22 through an RCA connector.

The optical input signal on line 30C and the coaxial input signal on line 30D are fed to respective line receivers 56 and 58. These line receivers 56 and 58 are required to convert the respective input signals to proper digital format for ultimate processing in digital circuitry 34. In particular, the optical signal on line 30C is fed to an optical digital receiver 56 (e.g., Shimadzu HK-3131-01) and outputted on line 70 while the coaxial input signal on line 30D is fed to a coaxial line receiver 58 (e.g., any conventional transformer network used in converting coaxial digital inputs) and outputted on line 72.

Depending on which digital audio source, an optical audio source or a coaxial audio source (i.e., a source having a digital audio signal available via an RCA connector), is coupled to the transmitter 22, the user sets the switching means 54 so that either the signal on line 70 or the signal on line 72 is coupled to the clock synchronization circuit 60 via signal line 74. The synchronization circuit 60 (e.g., Crystal Semiconductor CS8412 digital receiver) obtains the data clock from the selected incoming biphase-mark digital signal on line 74 and outputs a digital audio interface ($I^2S$ baseband) comprising a word clock on line 76A, a word data on line 76B, and a word select on line 76C to the digital interface transmitter 62.

If an analog audio source (e.g., an AM/FM tuner) is coupled to the transmitter 22, the user, in setting the switching means 54 accordingly, couples the signals on lines 68A, 68B and 68C to the digital interface transmitter 62. On the other hand, if an optical or coaxial audio source is coupled to the transmitter 22, the user, in setting the switching means 54 accordingly, couples the signals on lines 76A, 76B and 76C to the digital interface transmitter 62.

The digital interface transmitter 62 (e.g., Crystal Semiconductor's Digital Audio Interface Transmitter CS8402) provides for the interface between the A/D converter 52/clock synchronization circuit 60 and the serial data stream needed for transmission. The purpose of the digital interface transmitter 62 is to convert the digital audio interface ($I^2S$ baseband) into one serial bit stream (S/PDIF) that can be transmitted. In addition, the digital interface transmitter 62 allows additional subcode information to be sent along with the digital audio information. This allows control codes for such things as volume and tone controls, and other auxiliary information, to be relayed along with the digital audio information. The subcode information is also used to determine if the digital audio information is valid data. The microprocessor 64 (or a digital signal processor) can be used to generate the needed subcode information and transmits this subcode information to the digital interface transmitter 62 via code line 75. The output of the digital interface transmitter 62 can support the AES/EBU, IEC 958, S/PDIF, and EIAJ CP-340 interface standards. The serial data out is biphase-mark encoded and is provided to the digital audio circuitry 34 on input line 32. In addition, the digital interface transmitter 62 also introduces a synchronization signal into the serial data for distinguishing between left and right audio data and whereby that synchronization signal is detectable by the digital interface receiver 214 in the receiver 24.

The switching means 54 comprises a first switching element 78, a second switching element 80, the microprocessor 64, user audio source select switch 82 and audio source frequency select switch 84. When the user couples a particular audio source to the transmitter 22, the user then sets the audio source select switch 82 to the corresponding audio source indication. In addition, the user also sets the audio source frequency select switch 84 that corresponds to the sampling frequency of that particular audio source. Setting these two switches transmits corresponding electrical signals to the microprocessor on lines 86 and 88, respectively. These signals allow the microprocessor 64 to configure the first switching element 78 (e.g., any conventional electric select switch) and the second switching element 80 (e.g., any conventional electric select switch) so that only one set of the data word, clock and select on lines 68A, 68B and 68C or on lines 76A, 76B and 76C are coupled to the digital interface transmitter 62. The microprocessor 64 controls the switching elements 78 and 80 by signals on respective control lines 90 and 92. The audio source select switch 82 and the audio source frequency select switch 84 are located on the outside of the transmitter 22 unit.

The transmitter clock 66 (e.g., M2 Series D300 Voltage Controlled Oscillator) controls the digital sections of the transmitter 22. The clock 66 runs at 256 times the audio source sampling frequency which can be 32 kHz, 44.1 kHz, or 48 kHz. Thus, the transmitter clock 66 will be running at 8.192 MHz, 11.2896 MHz, or 12.288 MHz, respectively. The user selects one of these frequencies (corresponding to the audio source coupled to the transmitter 22) via the audio source frequency select switch 84. A control signal is transmitted from the switch 84 to the transmitter clock 66 on control line 94. The three different clock frequencies are used in order to be compatible with various sampling frequencies used in different digital audio source equipment. The required clocking signals for the A/D converter 52, the digital interface transmitter 62 and the digital audio circuitry 34 are all derived from this clock 66. The clock signals needed for these circuits are derived at by dividing the transmitter clock signal down, provided on clock line 96, to the desired frequency.

Figure 2B:
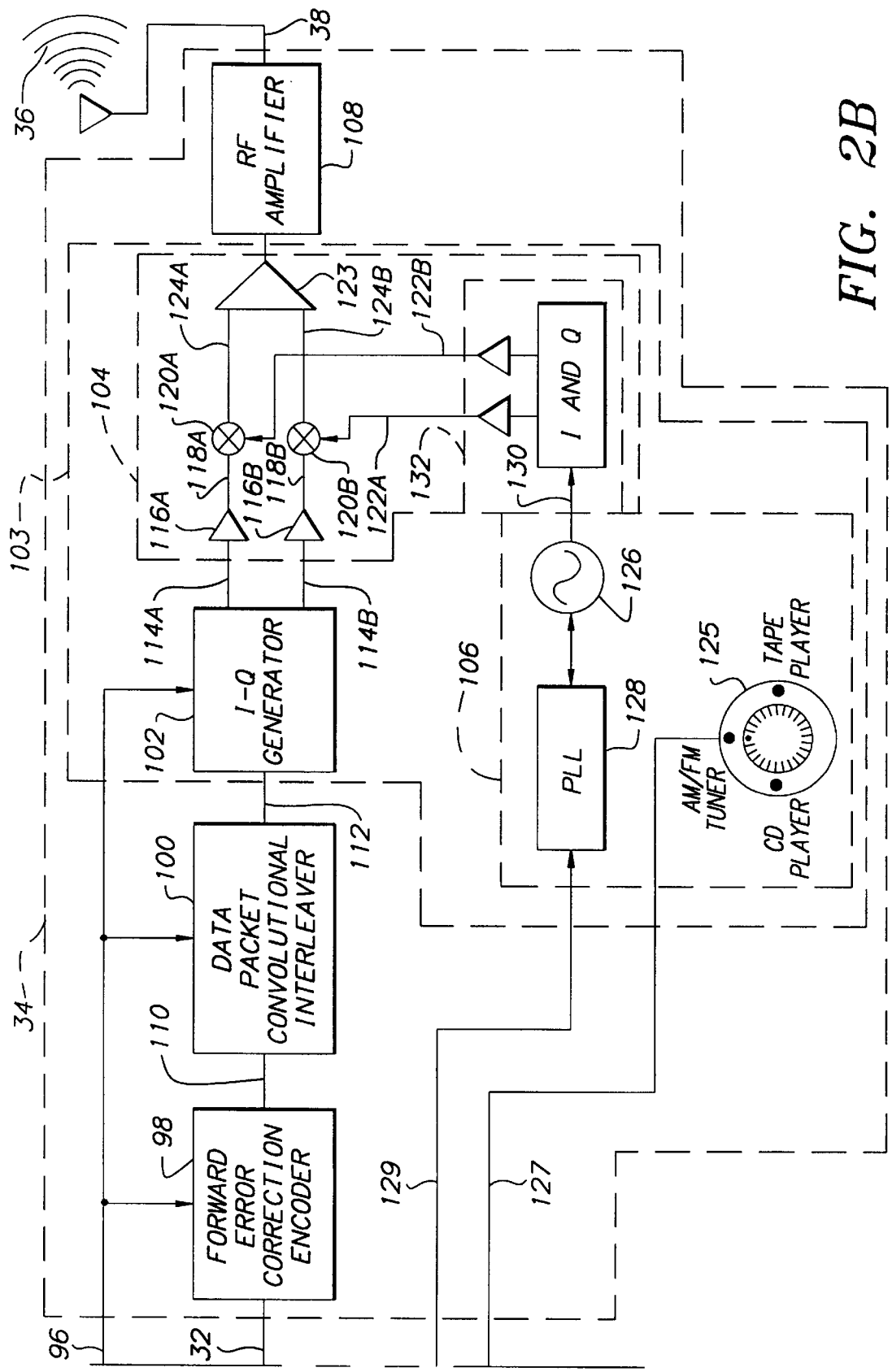

The details of the transmitter digital audio circuitry 34 will now be discussed. As shown in FIG. 2B, the digital circuitry 34 comprises a forward error correction (FEC) encoder 98, a data packet convolutional interleaver 100, a modulator 103 and an RF amplifier 108. The modulator 103 comprises an I-Q generator 102, a quadrature phase-shift keying RF modulator 104 and a local oscillator circuit 106. The encoder 98, interleaver 100 and the I-Q generator 102 operate in accordance with the transmitter clock 66.

Due to the RF properties of the system 20, errors in the digital transmission are likely to occur. Random noise and dropouts can cause serious data errors which result in poor performance. To overcome this, the combination of forward error correction (FEC) and data interleaving is performed on the digital audio information. Forward error correction (FEC) is the only feasible correction method because an automatic repeat request (ARQ) system could not operate in real time. Thus, using the forward error correction (FEC) scheme, it is possible to send coded information so that the data at the receiver 24 can be corrected. In order to implement the FEC, an encoder/decoder IC by Space Research Technology will be used, whereby encoding is performed in the transmitter digital circuitry 34 and the decoding is performed in the receiver digital circuitry 42, which will be discussed later. The SRT241203 is a Hyper-Fec III CMOS Hard Decision Forward Error Correction Encoder/Decoder. This FEC encoder 98 utilizes one-half rate extended Golay short block code to correct errors. The FEC decoder 198 (in the receiver digital circuitry 42, FIG. 3) can correct up to three random errors per codeword and it can detect up to four random errors in any codeword. The encoder 98/decoder 198 have a net coding gain of 3 dB at a BER (bit error rate) of $10^{-6}$. Thus, the FEC encoder 98 embeds a synchronization signal into the data stream whereby this synchronization signal is later detectable by the receiver FEC decoder 198 to initiate decoding.

The FEC encoder 98/decoder 198 alone can only correct random errors and has little effect in helping burst errors. To overcome this, a data packet interleaver 100 and deinterleaver 200 (in the receiver digital circuitry 42) are used to provide for burst error correction. The interleaver 100 essentially takes the incoming encoded digital audio information on line 110 and combines it in such a fashion that no adjacent audio information is next to each other. The net result is that when a burst error does occur, only a few bits from each codeword are in error instead of the entire codeword. This allows the FEC encoder 98/decoder 198 to correct these errors in each codeword. The interleaver 100 simply spreads out the burst error over multiple codewords so that they can be corrected. The interleaver 100/deinterleaver 200 is based on Space Research Technology's SRT-24INT. The SRT-24INT utilizes a convolutional interleaving design which provides for faster and more efficient interleaving. In addition, the SRT-24INT is easier to implement in the digital circuitries 34 and 42 because only one SRAM IC is needed. Synchronization is also faster and easier using convolutional interleaving versus block interleaving. Furthermore, a sync signal is added to the serial data stream at this point which is later used by the deinterleaver 200 in the receiver 24 for synchronization.

The information being transmitted is digital and, therefore, a digital transmission method is implemented in the modulator 103 to improve performance. Quadrature Phase Shift-Keying (QPSK) is used for various reasons such as reduced bandwidth requirements and relatively easy implementation. The carrier frequency for the system 20 will be in the 2.4 GHz band for several reasons. First, interference in this band is significantly reduced relative to other bands. Second, the available bandwidth meets the transmission requirements. Lastly, at 2.4 GHz, the antenna size (i.e., transmitter antenna 38 and receiver antenna 40) is much smaller and less obtrusive to the user. As will be discussed later with respect to the local oscillator circuitry 106, several frequencies within the 2.4 GHz band can be selected from by the user.

At this juncture, it should be noted that although a quadrature phase-shift keying (QPSK) modulation scheme is disclosed herein, a binary-phase shift keying (BPSK) scheme could also be implemented in the modulator 103 using the similar hardware described below. Furthermore, a corresponding BPSK scheme could also be implemented in the receiver demodulator using the similar hardware described for the receiver demodulation stage 134, as will be discussed later.

The RF modulator 104 is based on RF Micro-Devices RF2422 QPSK modulator. The modulator 104 requires a separate I (in-phase) input and Q (quadrature) input. The interleaved serial input signal on line 112 is first divided into separate I and Q serial data streams on lines 114A and 114B, respectively. This is accomplished by the I-Q generator 102 which comprises a serial-to-parallel shift register (not shown) and a clocking signal from the transmitter clock 66. The I and Q signals are fed to buffer amps 116A and 116B, respectively, in the RF2422. The two buffered signals on lines 118A and 118B are then fed to respective mixers 120A and 120B which have local oscillator signals, on lines 122A and 122B, that are 90° out-of-phase. The outputs from the two mixers on lines 124A and 124B are then combined at another buffer stage 123. A Triquint TQ9132 RF power amplifier 108 is then used to boost the power of the signal for transmission as broadcast signal 36 via transmitter antenna 38. The broadcast signal 36 is emitted at a power level that is in compliance with 47 CFR §15.249, the FCC requirement for wireless transmission in the 2.4–2.483 GHz frequency band.

The local oscillator circuitry 106 comprises a local oscillator 126, a Phase-Locked-Loop (PLL) 128, a manually-adjustable house code select switch 125 and the microprocessor 64. The local oscillator circuitry 106 produces any one of a number of carrier frequencies (e.g., 2.42 GHz, 2.44 GHz and 2.46 GHz). The user sets the house code select switch 125 (any variable position BCD switch that is located on the outside of the transmitter 22 unit) to a particular setting and this setting information is transmitted to the microprocessor 64 via data line 127. The microprocessor 64 then transmits the corresponding set of frequency data to the PLL 128 (e.g., Motorola MC12210 Serial Input PLL Frequency Synthesizer) on data line 129 which controls the local oscillator 126 (e.g., Z-Comm SMV2500 Voltage Controlled Oscillator) in generating the particular 2.4 GHz carrier frequency for the RF modulator 104. The local oscillator circuitry 106 is constructed in accordance with a similar transmitter local oscillator circuitry as disclosed in U.S. Pat. No. 5,491,839 (Schotz), assigned to the same assignee as this invention, namely L.S. Research, Inc., and whose disclosure is incorporated by reference herein. The only difference is that the local oscillator 128 operates in the 2.4 GHz range. The local oscillator output on line 130 is fed to a 90° carrier phase shift network 132 in RF modulator 104. This network 132 provides the two local oscillator signals, on lines 122A and 122B, that are 90° out-of-phase with respect to each other for mixing with the buffered signals on lines 118A and 118B, respectively.

The transmission frequencies of 2.42 GHz, 2.44 GHz and 2.46 GHz are exemplary only and are not meant to limit the present invention to those particular frequencies in the available 2.4 GHz band.

Figure 3A:
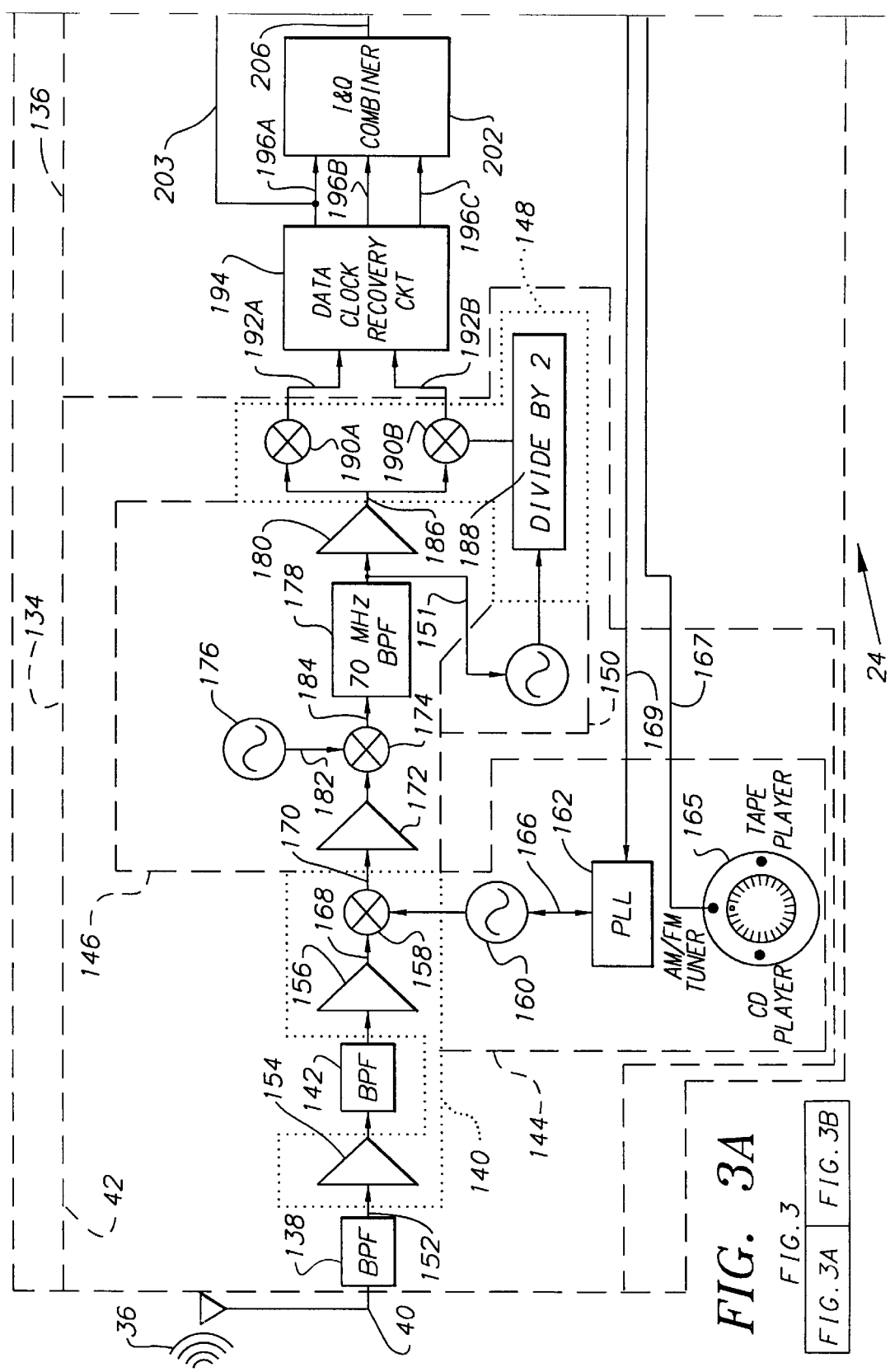
FIGS. 3A and 3B together illustrate a block diagram of the receiver of the digital wireless speaker system.
Figure 3B:
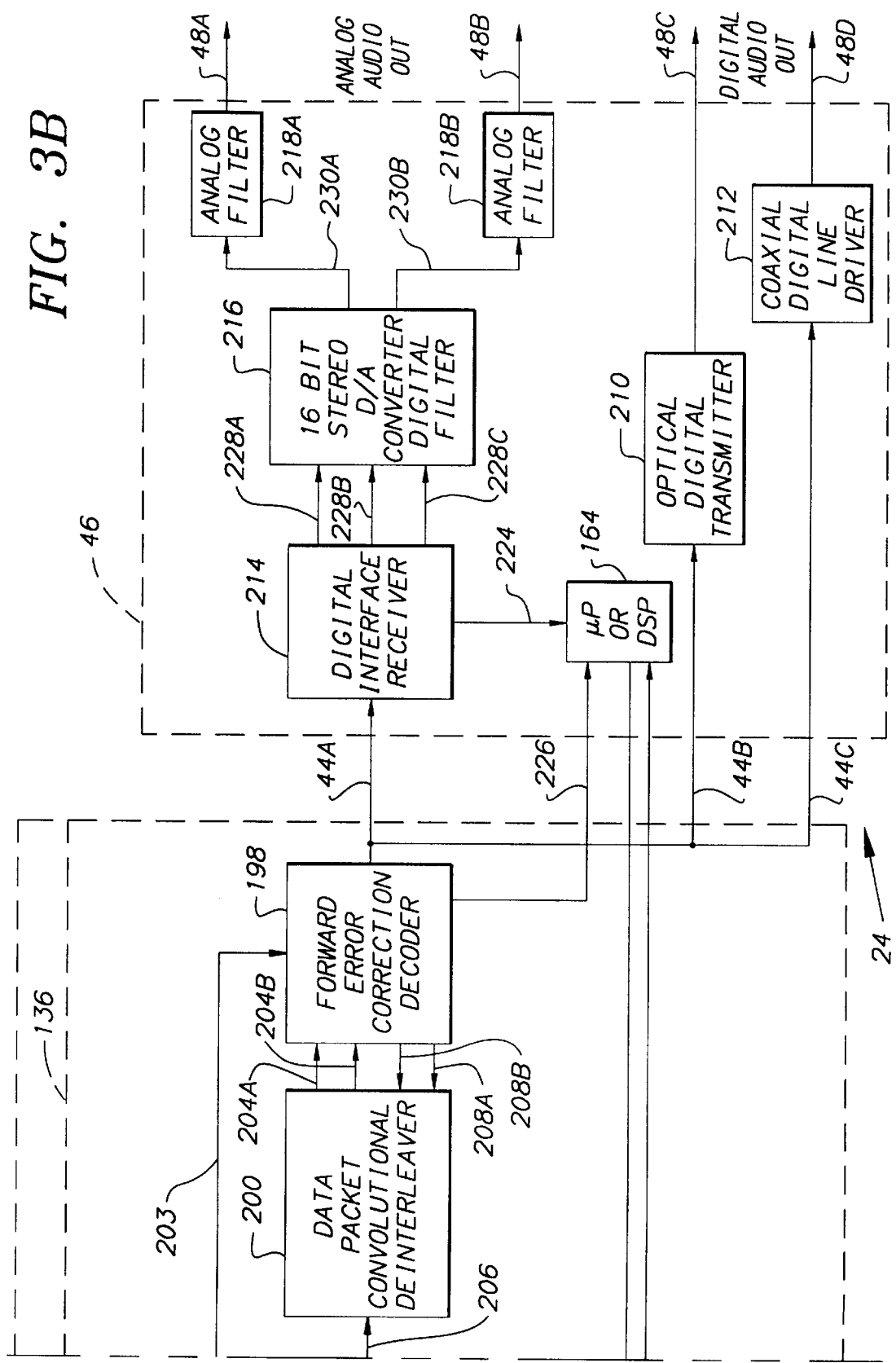

The details of the receiver 24 will now be discussed. As shown in FIGS. 3A–3B, the receiver digital audio circuitry 42 comprises a demodulation stage 134 and a recombination-decode stage 136.

As shown in FIG. 3A, the demodulation stage 134 comprises a first bandpass (BFP) filter 138, a receiver front end 140, a second bandpass filter 142, a first local oscillator circuitry 144, a second local oscillator circuitry 146, a quadrature demodulator 148 and a carrier recovery circuit 150.

The incoming broadcast signal 36 is fed from the receiver antenna 40 to a bandpass filter 138 to filter out undesired signals. This first filtered signal is then fed on input line 152 to the input of a receiver front end 140 (e.g., HP MGA-86576 Low Noise RF Amplifier and IAM 81008 Mixer). The front end 140 is comprised of a low noise amplifier 154, an RF amplifier 156, and a mixer 158. The low noise amplifier 154 amplifies the first filtered signal which is then fed to a second bandpass filter 142 for further filtering and amplification by RF amplifier 156 to produce an RF signal on line 168 in preparation for demodulation.

As shown in FIG. 3A, the first local oscillator circuit 144 comprises a local oscillator 160 (e.g., Z-Comm SMV2500 Voltage Controlled Oscillator), a Phase-Locked-Loop (PLL) 162 (e.g., Motorola MC12210 Serial Input PLL Frequency Synthesizer), a receiver microprocessor 164 (FIG. 3B) and a manually-adjustable house code select switch 165. At this juncture it should be noted that although the receiver microprocessor 164 (e.g., EPROM-based 8-bit CMOS Microprocessor PIC16C55 or a digital signal processor, e.g., Motorola DSP56002) is shown in FIG. 3B as comprising a part of the output means 46 (to be discussed in detail later), the microprocessor 164 also forms a part of the local oscillator circuit 144. Although a separate, dedicated microprocessor could be used exclusively in the output means 46, the microprocessor 164 is capable of multi-purpose use within the local oscillator circuit 144 and the output means 46. The first local oscillator circuit 144 is constructed in accordance with a similar receiver local oscillator circuit as disclosed in U.S. Pat. No. 5,491,839 (Schotz), assigned to the same assignee as this invention, namely L.S. Research, Inc., and whose disclosure is incorporated by reference herein. The only difference is that the local oscillator 160 operates at 2.117 GHz. In particular, the user sets the house code select switch 165 (any variable position BCD switch located on the outside of the receiver 24 unit) to the corresponding setting of the transmitter house code select switch 125 and this setting information is transmitted to the microprocessor 164 via data line 167. The microprocessor 164 then transmits the corresponding set of frequency data to the PLL 162 on data line 169 which controls the local oscillator 160 in tuning the receiver to the particular 2.4 GHz carrier frequency of the incoming broadcast signal 36.

Once the local oscillator circuit 144 is set to the particular transmitter carrier frequency, a first local oscillator signal on line 166 is mixed with the RF amplifier signal on line 168 by mixer 158. This essentially performs the down-conversion from the 2.4 GHz carrier frequency to a first IF (intermediate frequency) for image rejection. This first IF signal, from the output of the mixer 158, is fed on line 170 to the second local oscillator circuitry 146.

The second local oscillator circuitry 146 performs a down-conversion on the first-IF signal to a second-IF signal. This second down-conversion is necessary to provide better adjacent channel separation. The second local oscillator circuitry 146 comprises a first-IF amplifier 172, a mixer 174, a local oscillator 176 (e.g., a 255 MHz crystal oscillator), a 70-MHz bandpass filter 178 and a second-IF amplifier 180. In particular, the first-IF signal on line 170 is fed to the first-IF amplifier 172. This amplified first-IF signal is fed on line 174 to the mixer 176 and mixed with a local oscillator signal on line 182 that is set at 255 MHz. This mixing generates a second-IF signal on line 184 that is filtered by the 70 MHz bandpass filter 178 and then amplified by the second-IF amplifier 180. This amplified second-IF signal is transmitted on line 186 to the quadrature demodulator 148.

The quadrature demodulator 148 is an RF Micro-Devices RF2703 Quadrature demodulator. The demodulator 148 is comprised of a divide-by-two means 188 and two mixers 190A and 190B that, when used in conjunction with the carrier recovery circuit 150, demodulates the I and Q signals from the amplified second-IF signal. The carrier recovery circuit 150 is a frequency doubler that utilizes the filtered second intermediate frequency signal on line 151 to provide the requisite 140 MHz signal. The demodulated I and Q signals are then fed to recombination-decode circuit 136 on lines 192A and 192B, respectively.

The recombination-decoder circuit 136 comprises a data clock recovery circuit 194, an I-Q combiner 202, a convolutional deinterleaver 200 (FIG. 3B) and an FEC decoder 198 (FIG. 3B).

The data clock recovery circuit 194 (e.g., TRU050 Clock Recovery and Data Retiming Module), shown in FIG. 3A, comprises an internal phase locked loop that locks onto the incoming I and Q signals present on input lines 192A and 192B. The data clock recovery circuit 194 then recovers a clock signal from the I and Q signals and provides a synchronized clock signal, along with the I and Q signals, to the I-Q combiner 202 on lines 196A, 196B and 196C, respectively. This synchronized clock signal is also fed forward to the deinterleaver 200 (FIG. 3B) on line 203 for clocking-in the serial data from the I-Q combiner 202 on input line 206.

In the I-Q combiner 202, (FIG. 3A) the demodulated I and Q signals, on input lines 196B and 196C, respectively, are recombined to obtain a single serial digital data stream on output data line 206. In particular, the I-Q combiner 202 combines these signals using a parallel-to-serial shift register (not shown) and the synchronized clocking signal from the data recovery circuit 194. Next, as shown in FIG. 3B, the received serial data on line 206 is deinterleaved by the deinterleaver 200 (e.g., the SRT-24INT, discussed earlier). Synchronization of the deinterleaver 200 is accomplished by utilizing the sync signal that was added to the serial data by the interleaver 100 in the transmitter 22. To assure that the incoming data is valid and synchronized, the deinterleaver 200 and the FEC decoder 198 work together. In particular, the decoder 198 checks the incoming data and clock from output lines 204A and 204B, respectively, to see if the deinterleaver 200 is synched. The decoder 198 then provides error reporting on status lines 208A and 208B back to the deinterleaver 200. If the data is invalid, the audio can either be interpolated or muted depending on the dropout time. If the data is valid, the FEC decoder 198 decodes the data, as described below. The ability of the deinterleaver 200 to hold sync, once acquired, is determined by the reliability of the interleaved data clock recovered at the receiving deinterleaver 200.

The FEC decoder 198 (e.g., the SRT241203, as discussed earlier) decodes the deinterleaved data and corrects any errors due to the RF transmission using the one-half rate extended Golay short block code. The decoder 198 has the ability to locate and correct errors in the codewords in real time. The decoder 198 also provides outputs on the quality of the received codewords. Again, this error information is used to decide whether to interpolate the audio output or to mute it, as will be discussed below. The decoder 198 outputs digital audio signals on lines 44A, 44B and 44C to the output means 46.

The output means 46 (FIG. 3B) comprises an optical digital transmitter 210, a coaxial digital line driver 212, a digital interface receiver 214, a D/A converter 216, analog filters 218A and 218B and the receiver microprocessor 164.

In particular, an optical digital transmitter 210 (e.g., Optical Digital Transmitter Shimadzu HK-3131-03) and a coaxial digital line driver 212 (e.g., any conventional transformer network used for converting to coaxial digital format) are provided, on lines 44B and 44C, respectively, for converting the digital audio signals back into the particular optical and coaxial output format on output lines 48C and 48D, respectively. An optical output receptacle 220 and a coaxial output receptacle 222 are available for connection to external digital audio transducing equipment which comprise the requisite D/A converters, necessary for user listening. As stated earlier, by having the external audio equipment (not shown) provide the D/A means, the receiver 24 avoids multiple and unnecessary conversions which would only further degrade the quality of the audio signal.

The digital audio data on line 44A (FIG. 3B) is fed into the digital interface receiver 214 (e.g., Crystal Semiconductor's CS8412 digital audio interface receiver). The digital interface receiver 214 performs the function of taking in the digital serial information and demultiplexing it. The digital interface receiver 214 has the ability to receive and decode audio data according to the AES/EBU, IEC 958, S/PDIF, and EIAJ CP-340 interface standards. The interface receiver 214 decodes the subcode information that provides control information and also provides information on the quality of the digital audio data that was received. The receiver microprocessor 164, being coupled to the digital interface receiver 214 via interface line 224, is used to read the subcode information and determine the control codes. The control codes are used to control the receive end controls such as volume or tone controls. In addition, the microprocessor 164 obtains the error information from the decoder 198 on status line 226 and the digital audio interface receiver 214 and determines whether or not to mute the audio output. The microprocessor 164 could also perform signal processing on the digital audio data to perform a variety of special effects such as digital surround sound.

The digital audio output from the digital interface receiver 214 is comprised of three signals: a word clock on line 228A, a word data on line 228B, and a word select on line 228C. These three signals are compatible with a variety of digital-to-analog converters.

The 16 bit stereo D/A converter/digital filter 216 (e.g., TDA1305T DAC) is used to perform the digital-to-analog conversion. The D/A converter 216 also incorporates an upsampling filter and a noise shaper which increases the oversampling rate significantly. This reduces the requirements of post analog filtering. The analog audio left and right outputs from the D/A converter 216, on lines 230A and 230B, respectively, are then filtered by simple first-order analog filters, 218A and 218B, respectively. The filtered analog left and right audio output signals are then available on output lines 44A and 44B, respectively.

Both the transmitter 22 and the receiver 24 have respective power circuits (not shown) that convert input power (e.g., 120 VAC at 60 Hz) into proper voltage levels for appropriate transmitter and receiver operation.

It should also be noted at this point that a spread spectrum modulation technique, e.g., frequency hopping, direct sequence, time hopping or a hybrid of these three techniques, can be used in the system 20. Two exemplary spread spectrum techniques, a frequency hopping implementation (FIGS. 4A–5B) and a direct sequence implementation (FIGS. 6A–7B and FIGS. 8A–9B) are discussed below.

It should also be understood that the spread spectrum techniques of frequency hopping used in the digital wireless speaker system of FIGS. 4A–5B and in the spread spectrum techniques of direct sequence used the digital wireless speaker system of FIGS. 6A–9B are in accordance with 47 C.F.R. §§15.247–15.249, which are incorporated by reference herein; thus, the implementation of "frequency hopping" and "direct sequence" as these terms are used in this application are as defined in sections 15.247–15.249. As such, use of the terms "frequency hopping" or "direct sequence" in other references of systems using these techniques do not necessarily imply the frequency hopping or direct sequence specified in 47 C.F.R. §15.247–15.249, and thus do not teach the implementation of frequency hopping or direct sequence disclosed in the present application.

Figure 4A:
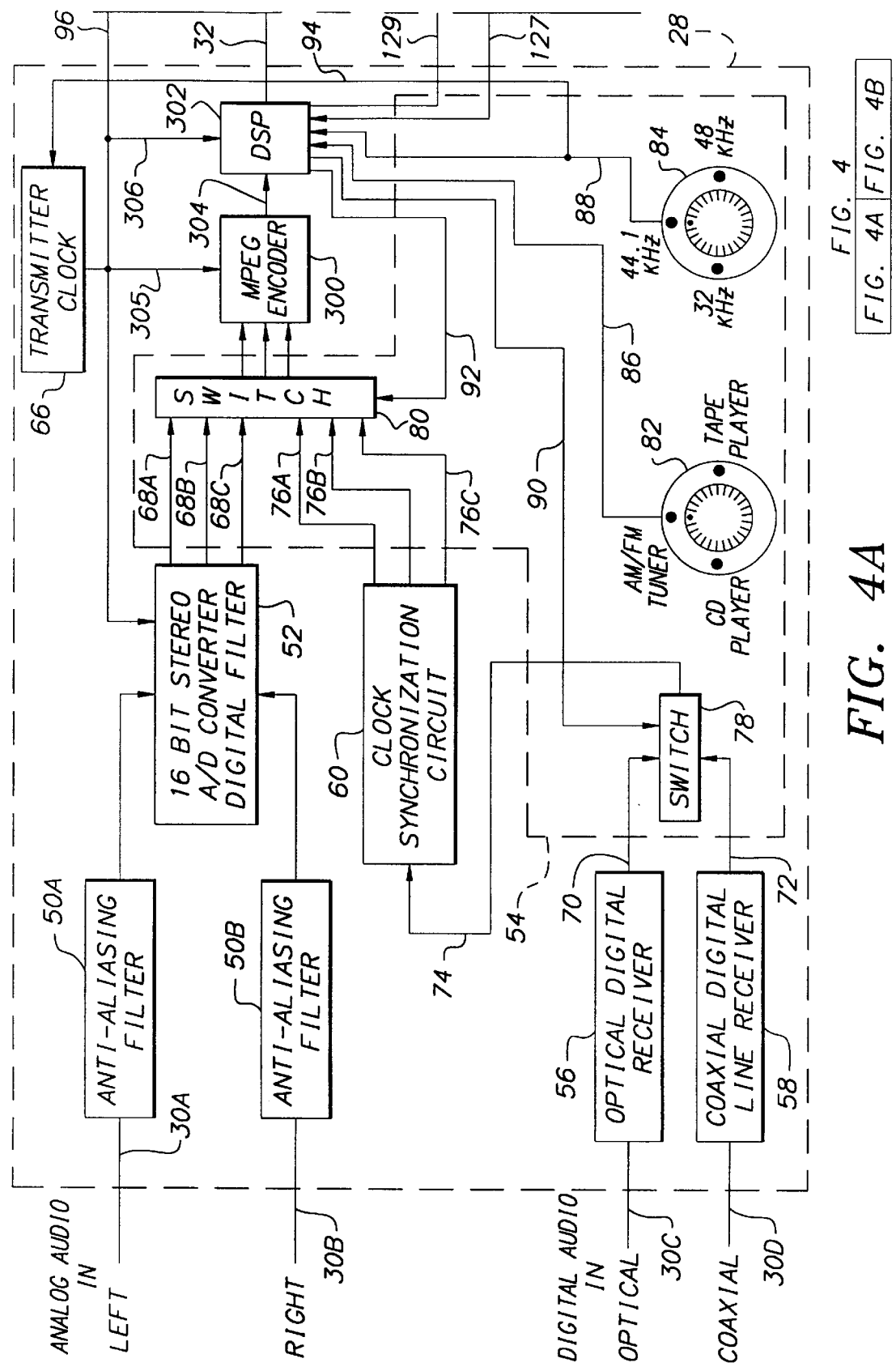
FIGS. 4A and 4B together illustrate a block diagram of the transmitter of the digital wireless speaker system using frequency hopping spread spectrum modulation.
Figure 5B:
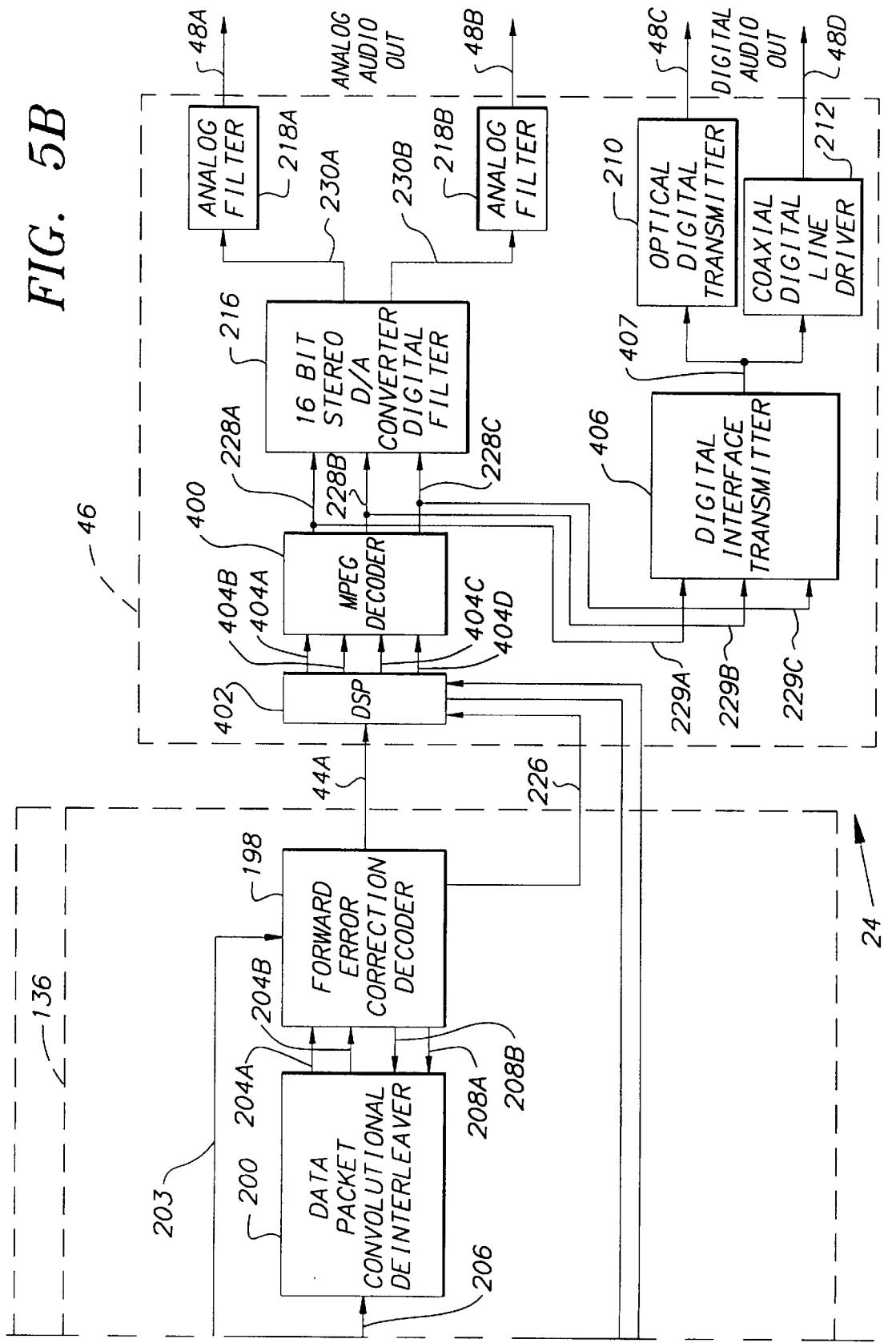

Due to the high bit rate involved in this system 20, in order to implement a practical frequency hopping spread spectrum modulation, audio compression/decompression must be implemented. To implement audio compression/decompression, the transmitter input means 28 and the receiver output means 46 must be modified as shown in FIG. 4A and 5B, respectively. In contradistinction, as will be discussed later, a practical direct sequence spread spectrum modulation digital wireless speaker system (FIGS. 6A–7B) can be implemented which requires no audio compression/decompression. On the other hand, where audio compression/decompression is desirable in a direct sequence spread spectrum wireless speaker system, FIGS. 8A–9B depict how the transmitter and receiver are modified to accommodate audio compression and decompression.

As shown in FIG. 4A, the transmitter input means 28 has been modified to include audio compression. In particular, the digital interface transmitter 62 has been replaced with a MPEG (moving picture expert group) encoder 300 (e.g., SAA2520 stereo filter and codec/SAA2521 masking threshold processor for layer 1 audio compression), and the microprocessor 64 has been replaced with a digital signal processor 302 (e.g., a DSP56002). The MPEG encoder 300 has the ability to provide a range of compression ratios. In this application, the compression ratio would provide for 384 kbit/sec given an audio input of 1.4 Mbit/sec. For this compression ratio, there is no subjective audio degradation compared to 16-bit PCM. The MPEG encoder 300 takes the digital audio interface output selected by the switch 80 and compresses that interface output into sub-band I$^2$S interface signals on line 304. The digital signal processor 302 then multiplexes the sub-band I$^2$S interface signals into a single serial bit stream while introducing synchronization preambles into the data stream. This serial bit stream is then outputted on the digital audio circuitry input line 32 where the bit stream is processed by the FEC encoder 98, the data packet convolutional interleaver 100 and the I-Q generator 102 in the same manner described previously. The MPEG encoder 300 is configured to perform layer 1 compression (basically, a simpler algorithm than layer 2). It should be noted that the MPEG encoder 300 and the digital signal processor 302 are coupled to the transmitter clock via clock lines 305 and 306, respectively. Furthermore, the digital signal processor 302 controls the switching means 54 and the PLL 128 in the same manner as described previously. In addition, the digital signal processor 302 also provides subcode information (e.g., volume and tone control) to be relayed with the digital information as stated previously with respect to the microprocessor 64.

As shown in FIG. 5B, the receiver output means 46 has been modified to include audio decompression. In particular, the digital interface transmitter 214 has been replaced with a MPEG decoder 400 (e.g., SAA2520 stereo filter and codec for layer 1 audio compression), and the microprocessor 164 has been replaced with a digital signal processor 402 (e.g., a DSP56002). Both the digital signal processor 402 and the MPEG decoder 400 reverse the audio compression established in the transmitter 22. In particular, the digital signal processor 402 takes the decoded data from the output of the FEC decoder 198 on digital output signal line 44A and provides sub-band $I^2S$ data (clock, data, select and error) on output lines 404A, 404B, 404C and 404D. The MPEG decoder 400 then decompresses this $I^2S$ sub-band data into $I^2S$ baseband data (word clock, word data and word select) on lines 228A, 228B and 228C, respectively, for processing the D/A converter 216, as discussed previously. Furthermore, the baseband $I^2S$ data must be converted into S/PDIF format for use by the optical digital transmitter 210 and the coaxial digital line driver 212. As such, the word clock, word data and word select are fed on lines 229A, 229B and 229C, respectively, to the input of a digital interface transmitter 406 (e.g., CS8402) for conversion into S/PDIF format on output line 407, which in turn feeds the S/PDIF format signal to both the optical digital transmitter 210 and the coaxial digital line driver 212. Note that due to the need to decompress the audio, the decoded data output from the FEC decoder 198 is not fed directly to the optical digital transmitter 210 nor to the coaxial digital line driver 212, as discussed previously.

Figure 4B:
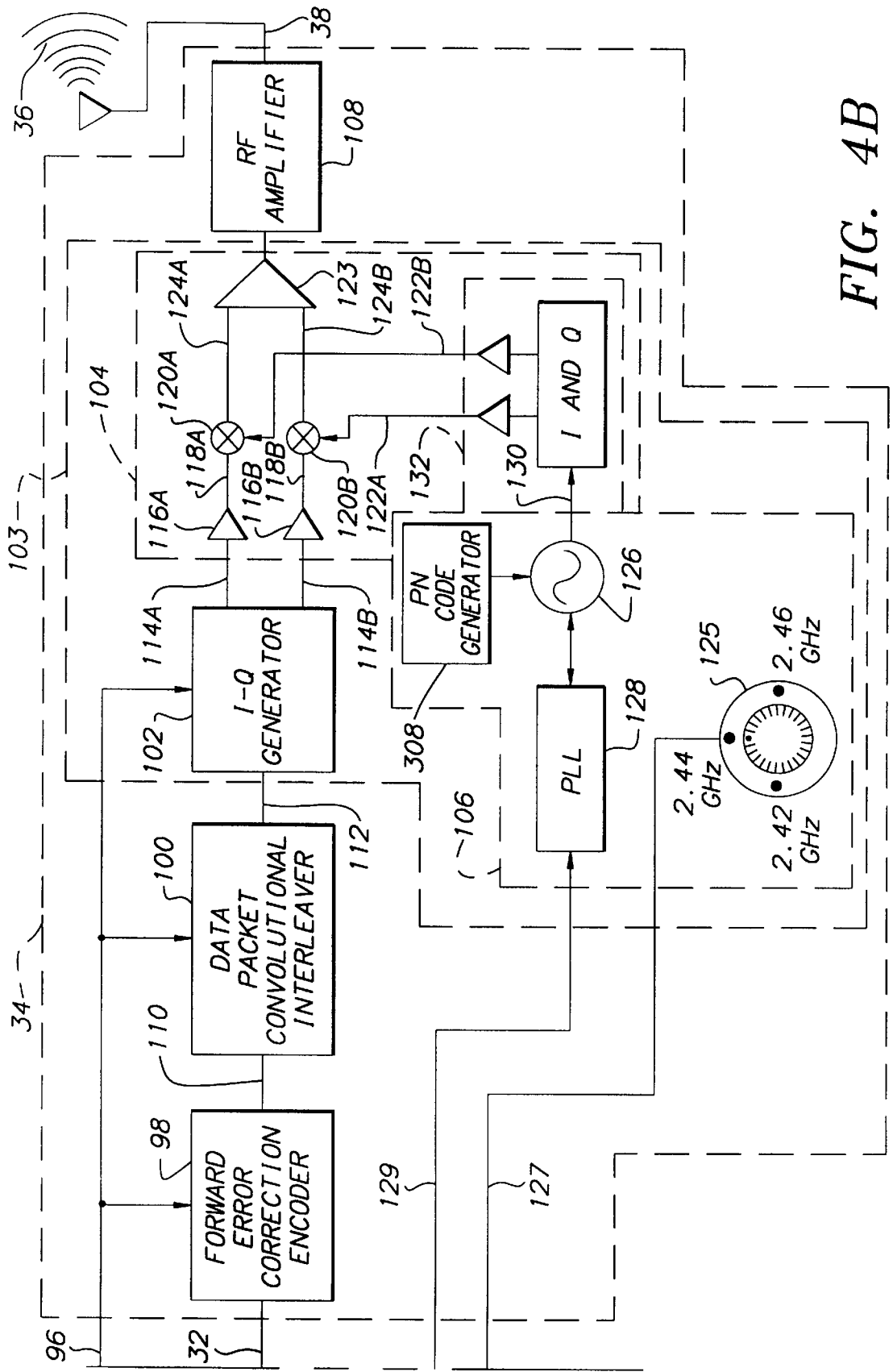

As shown in FIG. 4B, with frequency hopping spread spectrum modulation, a PN (pseudonoise) code generator 308 has been added to the transmitter local oscillator circuit 106 to control the local oscillator 126. This modulation technique changes the carrier frequency at a constant rate within the 2.4 GHz band. Correspondingly, in the receiver 24, the reverse of this change is implemented. In particular, as shown in FIG. 5A, a PN code generator 408 along with a PN code synchronization circuit 410 have to be added to the receiver first local oscillator 144. The PN code synchronization circuit 410 output is fed to the oscillator 160 so that the receiver 24 can track the carrier frequency when it is hopping around.

It should also be pointed out that use of spread spectrum modulation techniques in the 2.4 GHz band are allotted up to 1 watt of transmitting power rather than only the 1 milliwatt of power allotted for non-spread spectrum modulation. 47 CFR §15.249.

It should further be noted that although audio compression/decompression is necessary for implementing a practical frequency hopping spread spectrum modulation, both FEC encoding/decoding and data packet convolutional interleaving/deinterleaving may not be required for practical frequency hopping spread spectrum modulation. First, at higher transmitter power levels (as is allowed by the FCC for spread spectrum modulation) errors in the received signal are reduced. Second, where spread spectrum modulation is used, the transmitted signal is, in effect, spread out so that the carrier frequency is not residing at any one particular frequency during the transmission; as such, any interference from another signal using the same frequency at one point in time causes errors only in one portion of the transmitted signal rather than the entire signal. Therefore, the frequency hopping spread spectrum techniques shown in FIGS. 4A–5B could be depicted with neither FEC encoding/data packet convolutional interleaving in the transmitter digital audio circuitry 34 nor FEC decoding/data packet convolutional deinterleaving in the receiver recombination stage 136.

In particular, the input means 28 in FIG. 4A would generate a digital serial bit stream signal on digital audio circuitry input line 32 and then directly feed this signal to the I-Q generator 102 where it would be processed as described earlier and then modulated using spread spectrum techniques to produce a modulated carrier signal. Correspondingly, in the receiver 24, in FIG. 5B, once the modulated carrier signal is demodulated (using frequency hopping spread spectrum demodulation) and converted into a single serial data stream signal by the I-Q combiner 202 on line 206, the data stream signal would be fed directly to the digital signal processor 400 on digital output signal line 44A.

In FIGS. 6A–7B, there is shown a digital wireless speaker system that uses direct sequence spread spectrum modulation but does not use (1) audio compression/decompression, nor (2) forward error correction coding/decoding nor (3) convolutional interleaving/deinterleaving.

The direct sequence spread spectrum (DSSS) embodiment (FIG. 6A) includes an input means 28 similar to the input means 28 of FIG. 1, except that the digital interface transmitter 62 has been replaced with a DSP 500 (e.g., a DSP56002, or discrete logic) and a DSSS transmitter 502. The DSP 500 embeds synchronization information into the digital audio bit stream such that the receiver (FIGS. 7A–7B) has a method to resynchronize. In particular, the DSP 500 embeds a 16 bit sync word into the into the digital audio bit stream, forming a digital audio bit stream 504 containing a sync word.

To avoid having to increase the data rate of the digital audio data to accommodate this sync word, the DSP 500 disperses the sync word so that in every 16th bit of the digital audio samples, one bit of the 16 bit sync word is inserted. In effect, the 16 bit digital audio data is converted to a 15 bit digital audio data sample having one sync bit embedded therein; thus, the sync word is spread out over 256 digital audio bits. Upon receipt the receiver 24, the receiver 24 uses the 16th bit in every sample for synchronization purposes. The result of this embedded synchronization is to provide a method whereby the digital audio bit stream being transmitted contains continuous sync information while the clock rate for the digital audio bit stream remains the same. Thus, the purpose of the DSP 500 is to place one bit of the sync word into the 16 bit of every audio sample and then repeat the process for every 256 bits of digital audio data.

Thus, up to this point, this portion of the input means 28 acts as "converting means" to convert the audio input signal into a digital serial bit stream signal at a high digital audio bit rate.

Figure 6A:
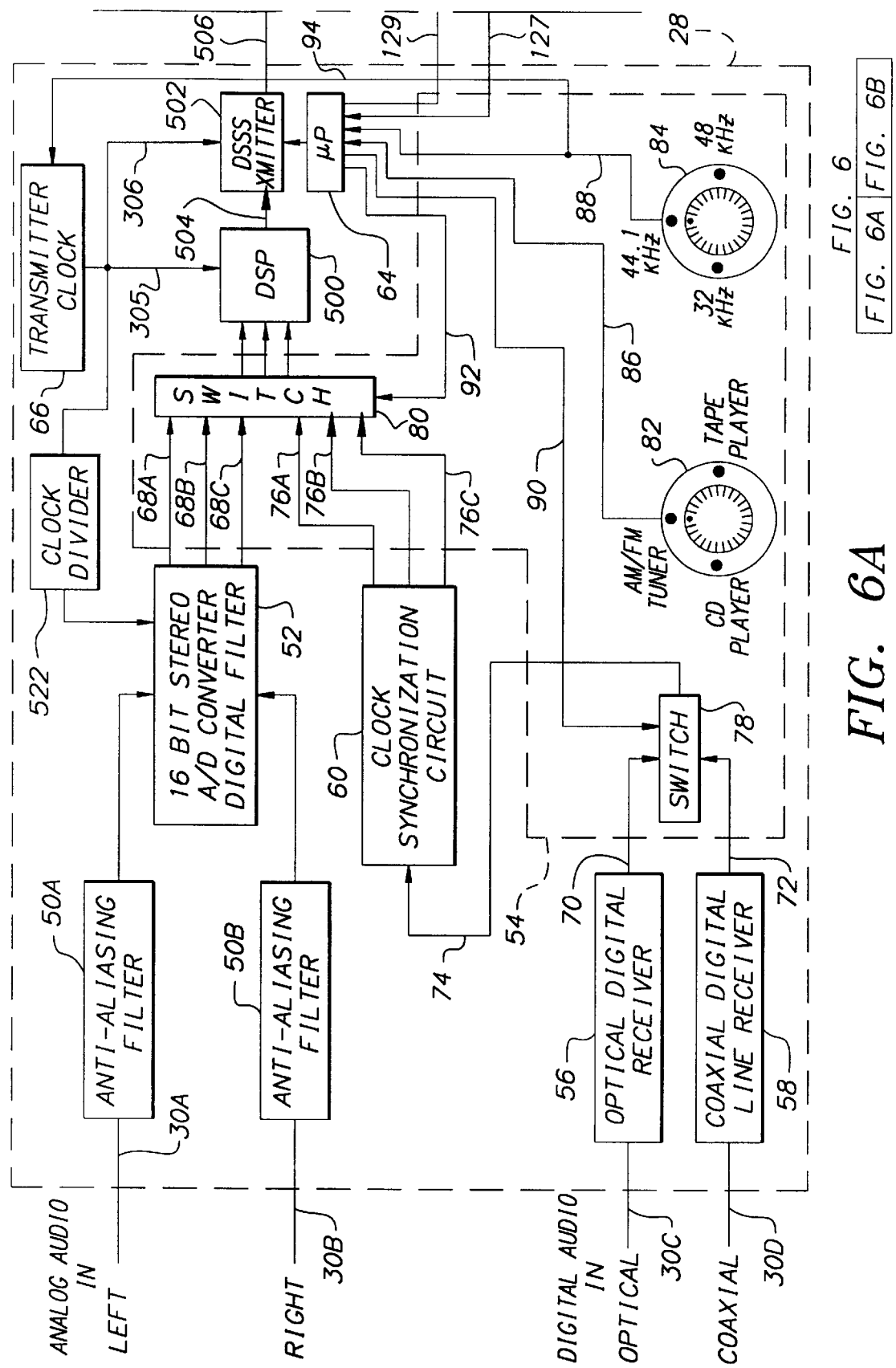
FIGS. 6A and 6B together illustrate a block diagram of the transmitter of the digital wireless speaker system using direct sequence spread spectrum modulation.
Figure 6B:
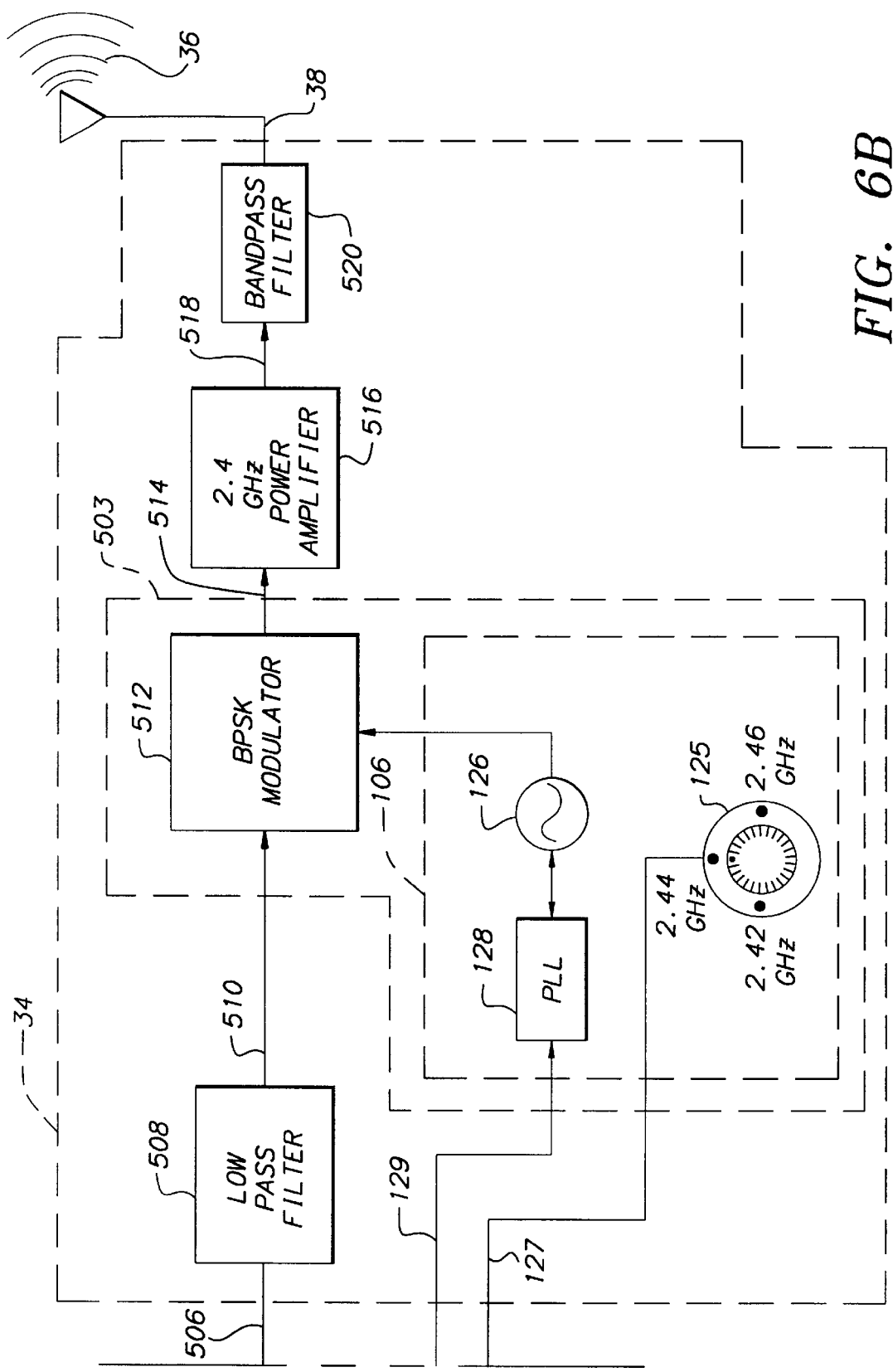

As shown in FIG. 6A, the digital audio bit stream 504 containing the sync word is then sent to the DSSS transmitter ASIC 502 (Cylink SSTX, U.S. Pat. No. 5,157,686, whose disclosure is incorporated by reference herein). The DSSS transmitter 502 processes the digital audio data and outputs baseband spread spectrum data. The spread spectrum data is arrived at by outputting one of four different PN sequences depending upon the input data. This in effect performs the spread of the data. Since the PN sequence is 16 bits in length, the chipping rate of the DSSS transmitter output 506, is 22.5792 Mbps, which is approximately 16 times the digital audio bit rate (approximately 1.4 Mbps).

The DSSS transmitter output 506 (chipped data) is then sent to a low pass filter 508 (FIG. 6B) to reduce the required transmit bandwidth of the signal. The filtered output 510 is then fed to a modulator stage 503 comprising a BPSK modulator 512 (RF Monolithics RF2422) and the local oscillator circuitry 106. The BPSK modulator 512 takes the baseband digital data of the filtered output 510 and directly upconverts this to the 2.4 GHz carrier frequency forming the modulated signal 514. Use of the BPSK modulator 512 is advantageous because it eliminates additional upconverting stages, thus reducing the need for additional oscillators and IF filters.

After the BPSK modulator 512, the modulated signal 514 is fed to a 2.4 GHz power amplifier 516 to increase its output power to no greater than 1 watt. The amplified signal 518 is then sent to a bandpass filter 520 and delivered to the antenna 36.

It should be noted that for proper operation of the A/D converter digital filter 52 with the DSP 500 a clock divider 522 (FIG. 6A, e.g., divide-by-8) is coupled to the A/D converter digital filter 52.

The details of the receiver 24 using DSSS (FIGS. 7A–7B) will now be discussed. It should be noted that the "despreading" processing in the receiver 24 using DSSS is not conducted in the "RF" section of the demodulation stage 134 but rather the "despreading" processing is performed on the digital baseband signal in a direct sequence spread spectrum (DSSS) recovery stage 501 that replaces the recombination stage 136 of the receiver shown in FIGS. 3A–3B and of the frequency hopping receiver shown in FIGS. 5A–5B.

As shown in FIG. 7A, upon receipt by the receiver antenna 40, the 2.4 GHz spread spectrum signal is first filtered by a bandpass filter 138 and then amplified by the LNA 154. The output signal of the LNA 154 is translated to an IF frequency of approximately 255 MHz via a mixer 524 and the local oscillator circuit 144. This IF signal is then filtered by an IF filter 526 and amplified by an IF amplifier 528. This amplified signal is then sent to an IF receiver (Philips IF receiver IC, NE615) which comprises an I-DATA IF receiver 530A and a Q-DATA IF receiver 530B. The NE615 also comprises a mixer (not shown), a crystal oscillator 532, an IF amplifier, IF limiter, and RSSI (receive signal strength indicator) circuitry, the last three of which are not shown. Once the signal reaches the NE615, it is then down-converted to baseband and amplified by the IF amplifier. This signal is then sent to the limiting IF amplifiers for additional gain. The output of the NE615 is sent to low pass data filters 534A and 534B and then to data comparators 536A and 536B. The IF amplifiers (not shown), lowpass data filters (534A and 534B), and the data comparators (536A and 536B) provide for a clean digital data signal that can be processed by the DSSS receiver 540.

It should be noted that although a BPSK modulator 512 (FIG. 6B) is used in the digital circuitry 34 of the transmitter 22 using DSSS, a QPSK demodulation architecture (FIG. 7A) is used to improve the processing capabilities of the receiver 24 using DSSS. It is also recognized by anyone skilled in the art that it would not be necessary to use the QPSK demodulation architecture and that only the I-DATA receiver 530A is really needed (thus, for some performance reduction, the Q-DATA receiver 530B, a −90° phase shifter 538, the low pass filter 534B and the additional data comparator 536B could be eliminated from FIG. 7A).

Figure 7B:
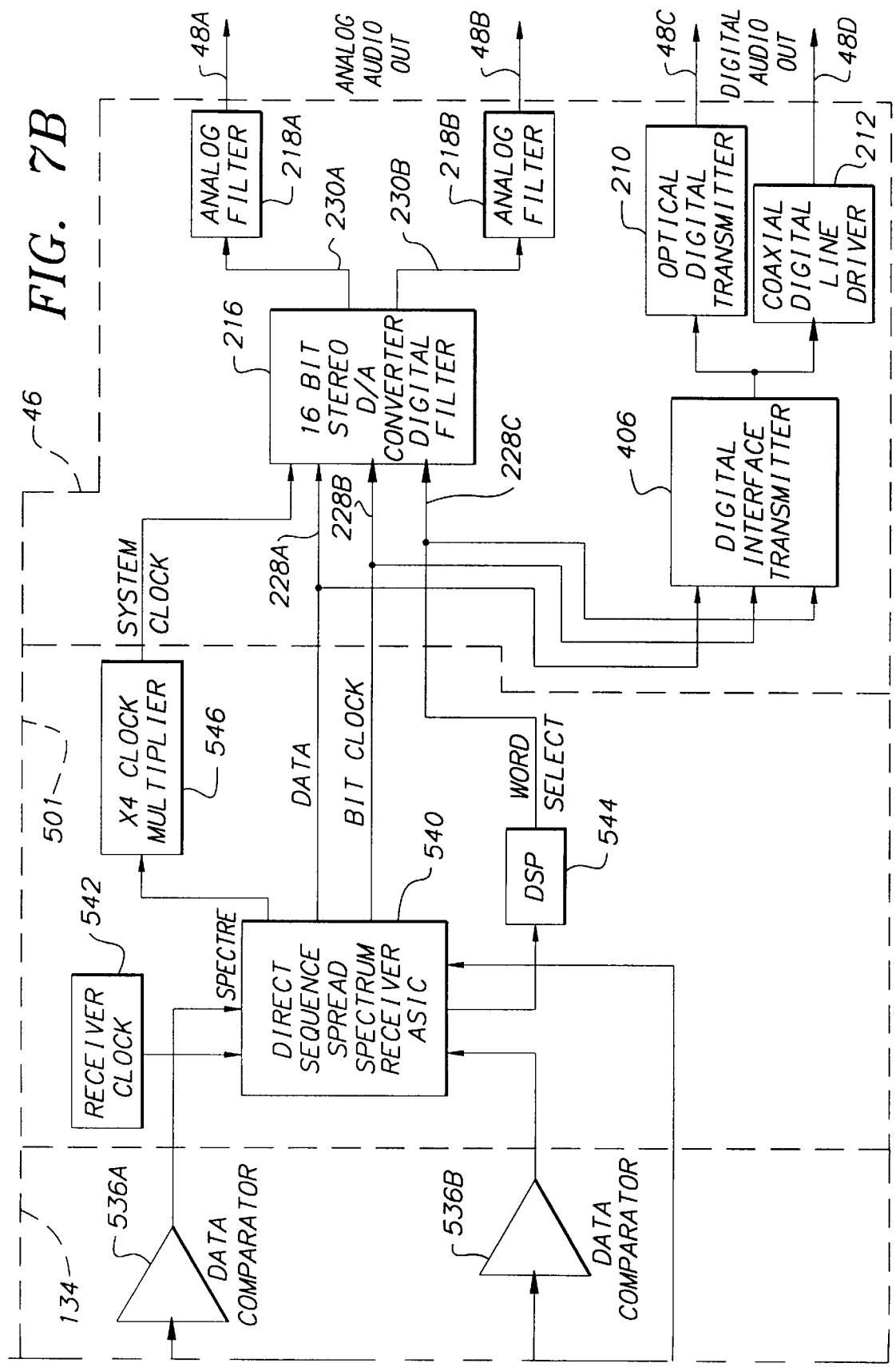
Figure 8B:
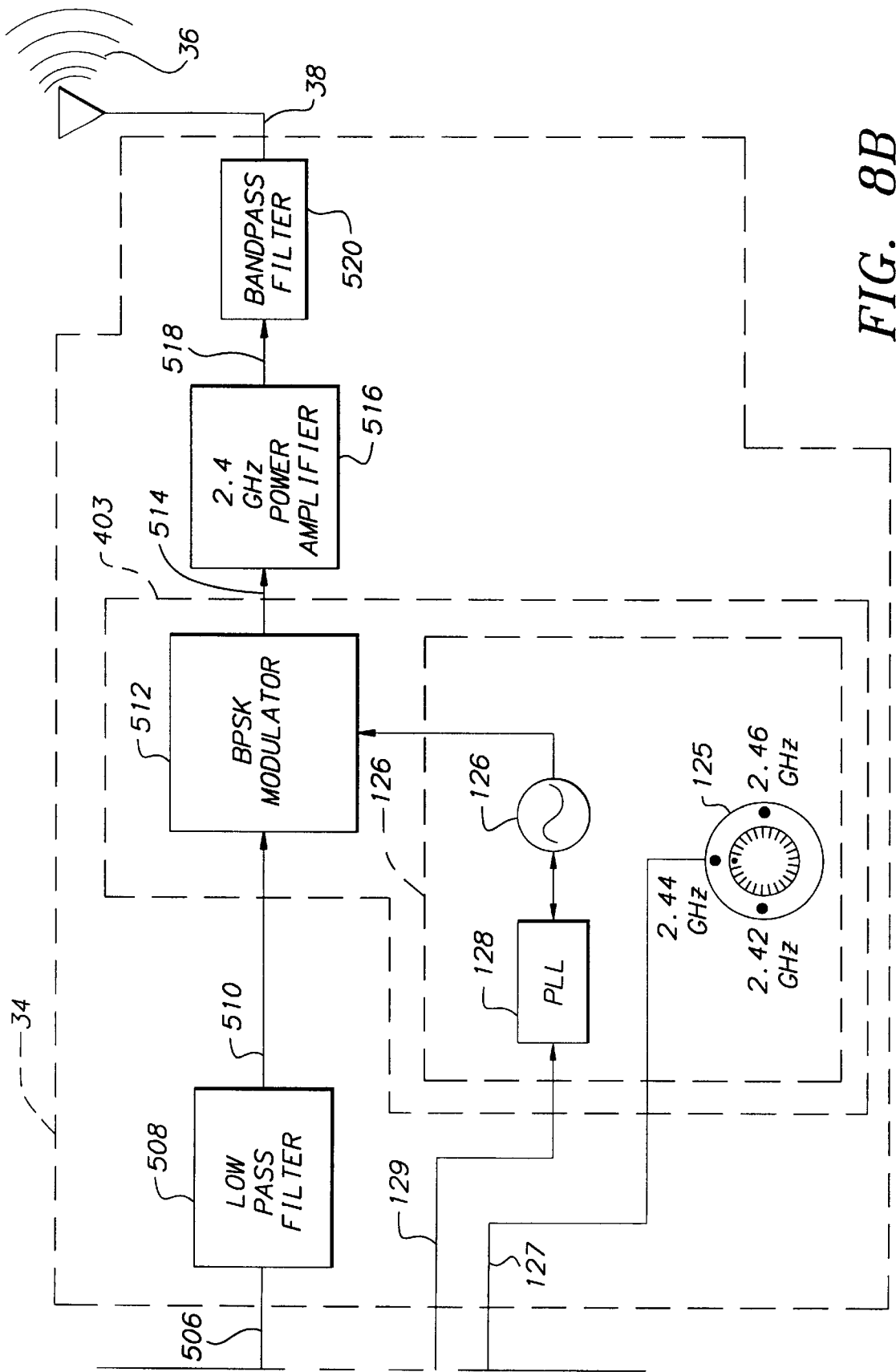

As shown in FIG. 7B, the baseband digital signal is then sent to a direct sequence spread spectrum receiver ASIC 540 (Cylink, part #SPECTRE, U.S. Pat. No. 5,157,686). The DSSS receiver 540 essentially "decodes" the digital data signal to provide back the original digital audio data 228A and its associated bit clock 228B (the DSSS receiver 540 performs the clock recovery). The particular operation of the Cylink, part #Spectre is known to those skilled in the art and is incorporated by reference herein; thus, the actual operation of the is Cylink, part #Spectre will not be discussed here. A receiver clock 542, similar to the transmitter clock 66, feeds the DSSS receiver 540 the proper clock.

In general, a DSSS receiver 540 processes the incoming digital baseband data to perform PN acquisition; a variety of methods of performing PN acquisition is known to those skilled in the art. This incoming digital data is multiplied inside the DSSS receiver 540 by a known PN sequence to produce a measure of correlation. This measure of correlation is then used to decide whether the two codes are synchronized and what to do if they are not. Thus, the DSSS receiver 540 could never receive the spread spectrum signal unless it knows what PN sequence was used in the transmitter 22 (thus the benefit of security). Once the DSSS receiver 540 is synchronized to the incoming PN sequence, the DSSS receiver 540 can then output the digital audio data 228A and the bit clock 228B.

The digital audio data 228A and the bit clock 228B are then sent to the stereo D/A converter 216. The only remaining signal needed by the D/A converter 216 is the word select signal 228C which indicates to the D/A converter 216 which data is the left audio signal and which data is the right audio signal, as well as providing the location of the most significant bit (MSB) of each sample. A DSP 544 (e.g., a DSP56002, or discrete logic) provides this signal. The function of the DSP 544 is to extract the 16th bit from every 16 bit audio sample for a span of 256 bits. After extracting 16 bits from 256 bits of digital data, the DSP 544 then compares this word to the known sync word bit pattern to see if there is a match. If the signals are equal, then the receiver 24 knows the timing of the word select 228C and it can output this to the D/A converter 216. If there is no match, the DSP 544 then extracts another 16 bit sample from 256 bits of digital data but it will move its reference with respect to the digital data (this is accomplished by simply dropping a clock pulse reference such that the data comparator is loaded with a different set of 16 bits). This search process continues until the receiver 24 finds the sync word that was embedded by the transmitter 22. If synchronization is ever lost, the receiver 24 can easily require sync by returning to this search routine. Note that the incoming digital data to the receiver 24 always contains this sync information allowing the receiver 24 a continuous method of synchronization (note: the maximum time to resync would be 2.19 msec which is most likely not audible).

To permit proper operation of the DSSS receiver 540 with the D/A converter 216, a 4-times clock multiplier 546 is coupled between the DSSS receiver 540 and the D/A converter 216.

Figure 9B:
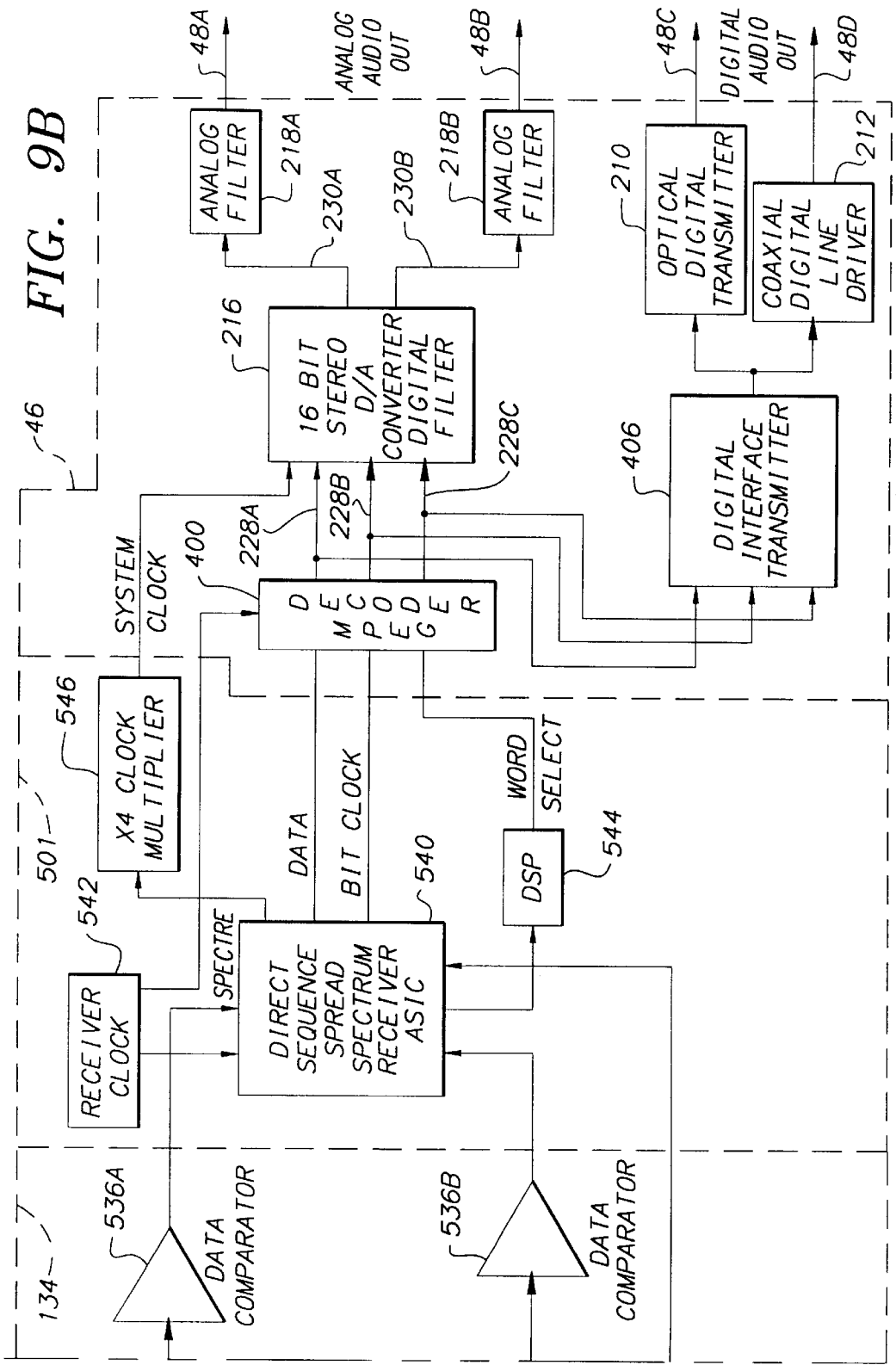

It should be noted that the above DSSS operation does not require audio compression/decompression. However, where it is desirable to include such audio compression/decompression, the MPEG encoder 300 is coupled between the switch 80 and the DSP 500 in the transmitter 22 (see FIGS. 8A–8B) and the MPEG decoder 400 is coupled between the DSSS receiver 540 and the D/A converter 216 in the receiver 24 (FIGS. 9A–9B).

Without further elaboration, the foregoing will so fully illustrate the invention that others may, by applying current or future knowledge, adopt the same for use under various conditions or service.

We claim:

1. A high fidelity, digital wireless transmission, stereo audio system for use with at least one audio source which provides an audio input signal, said audio system arranged for wirelessly transmitting over the air an electrical signal representing said audio input signal, said stereo audio system comprising:

a transmitter arranged to be coupled to said at least one audio source, wherein said audio input signal comprises high fidelity, stereo audio information that is susceptible to RF dropout and comprising:

analog-to-digital converting means for converting said audio input signal into a digital audio interface signal at a high digital audio bit rate, thereby defining a source data rate;

a digital signal processor, coupled to said analog-to-digital converting means, for embedding a sync word into said digital audio interface signal at a transmit data rate, said transmit data rate being equal to said source data rate;

direct sequence spread spectrum means, coupled to said converting means, for generating baseband spread spectrum data from said digital serial bit stream signal, said direct sequence spread spectrum means including a processing gain of at least 10 dB;

carrier signal producing means for producing a carrier signal of at least 2.4 GHz;

modulation means for modulating said carrier signal with said baseband spread spectrum data to produce a modulated carrier signal;

first antenna means for emitting over the air said modulated carrier signal at a power level not exceeding approximately 1 watt; and a receiver located within a range of approximately 10 to 300 feet (3 to 90 meters) of said transmitter and being coupled to an audio transducing device, said receiver receiving and demodulating said modulated carrier signal into an audio output signal, said receiver comprising:

a second antenna means for receiving said modulated carrier signal radiated from said first antenna;

demodulation means for demodulating said modulated carrier signal into a baseband digital signal;

direct sequence spread spectrum recovery means, coupled to said demodulation means, for decoding said baseband digital signal into digital audio data based on pseudonoise sequence acquisition and for recovering an associated clock;

output means for converting said digital audio data, in accordance with said clock, into an audio output signal having a format compatible with the audio transducing device, said output means outputting the left and right audio data to the audio transducing device upon detection of said embedded synchronization signal.

* * * * *

UNITED STATES PATENT AND TRADEMARK OFFICE
CERTIFICATE OF CORRECTION

PATENT NO. : 5,946,343
DATED : August 31, 1999
INVENTOR(S) : Larry Schotz, William R. Steinike, Mark R. Wolski It is certified that error appears in the above-identified patent and that said Letters Patent is hereby corrected as shown below:

In Fig. 2B, replace "CD PLAYER" with -- 2.42 GHz--.

In Fig. 2B, replace "AM/FM TUNER" with -- 2.44 GHz--.

In Fig. 2B, replace "TAPE PLAYER" with -- 2.46 GHz--.

In Fig. 3A, replace "CD PLAYER" with -- 2.42 GHz--.

In Fig. 3A, replace "AM/FM TUNER" with -- 2.44 GHz--.

In Fig. 3A, replace "TAPE PLAYER" with -- 2.46 GHz--.

Signed and Sealed this

Eighth Day of February, 2000

Attest:

Attesting Officer

Q. TODD DICKINSON

Commissioner of Patents and Trademarks